United States Patent
Araya et al.

(10) Patent No.: US 7,133,436 B2
(45) Date of Patent: Nov. 7, 2006

(54) PATH DETECTION APPARATUS IN CDMA RECEPTION DEVICE

(75) Inventors: Yasuteru Araya, Kanagawa (JP); Yuichi Maruyama, Kanagawa (JP)

(73) Assignee: NEC Electronics Corporation (JP)

( * ) Notice: Subject to any disclaimer, the term of this patent is extended or adjusted under 35 U.S.C. 154(b) by 672 days.

(21) Appl. No.: 10/226,017

(22) Filed: Aug. 23, 2002

(65) Prior Publication Data

US 2003/0048833 A1 Mar. 13, 2003

(30) Foreign Application Priority Data

Aug. 30, 2001 (JP) ............................. 2001-262516

(51) Int. Cl.
*H04B 1/69* (2006.01)
*H04B 1/707* (2006.01)
*H04B 1/713* (2006.01)

(52) U.S. Cl. ...................... 375/148; 375/144; 370/342; 455/506; 455/504

(58) Field of Classification Search ................ 375/148, 375/144, 349; 370/342; 455/506, 504
See application file for complete search history.

(56) References Cited

U.S. PATENT DOCUMENTS

| | | | | |
|---|---|---|---|---|
| 6,078,611 | A | | 6/2000 | La Rosa et al. |
| 6,157,687 | A | * | 12/2000 | Ono ............................. 375/347 |
| 6,272,167 | B1 | * | 8/2001 | Ono ............................. 375/144 |
| 6,768,729 | B1 | * | 7/2004 | Ohsuge ....................... 370/342 |
| 6,795,422 | B1 | * | 9/2004 | Ohsuge ....................... 370/342 |

FOREIGN PATENT DOCUMENTS

| | | |
|---|---|---|
| EP | 0 756 391 A1 | 1/1997 |
| EP | 0 989 685 A2 | 3/2000 |
| JP | 8-181636 | 7/1996 |
| JP | 10-190522 | 7/1998 |
| JP | 10-336072 | 12/1998 |
| JP | 11-298401 | 10/1999 |
| JP | 2000-101549 | 4/2000 |
| JP | 2000-115030 | 4/2000 |
| JP | 2000-134135 | 5/2000 |
| JP | 2000-252867 | 9/2000 |
| JP | 2001-16134 | 1/2001 |
| JP | 2001-186056 | 7/2001 |

OTHER PUBLICATIONS

Japanese Office Action dated May 17, 2005 (and English translation of relevant portion).

* cited by examiner

*Primary Examiner*—Phuong Phu
(74) *Attorney, Agent, or Firm*—Dickstein, Shapiro, LLP.

(57) ABSTRACT

A path detection apparatus for use in a CDMA reception device includes: storage means for storing a delay profile; and path detection means for detecting a path by reading the delay profile from the storage means, and performing a rake-combining process based on the read delay profile. With the configuration, the path detection means includes: reference path detection means for detecting a reference path for detection of a probable path based on the delay profile read by the storage means; and detection means for detecting as a probable path in the rake-combining process a path existing in a path detecting time in which reception characteristic of the CDMA reception device can be improved from the detecting time of the reference path detected by the reference path detection means.

22 Claims, 18 Drawing Sheets

PATH DETECTION APPARATUS IN CDMA RECEPTION DEVICE

BACKGROUND OF THE INVENTION

1. Field of the Invention

The present invention relates to a path detection apparatus in a CDMA reception device and, more specifically, to a path detection apparatus capable of eliminating the misidentification of a path as soon as possible.

2. Description of the Prior Art

A well-known path detecting method for use with the CDMA reception device generates a delay profile, and detects N (N indicates a natural number determined by the number of fingers) paths having high reception levels in the delay profile as the paths to be rake-combined.

The delay profile shows the reception level with the lapse of time as shown in FIG. 12. The delay profile is generated as follows. The horizontal axis shown in FIG. 12 indicates time with a scale indicating ¼ chip. The vertical axis indicates a reception level (code correlation value). One chip refers to a basic unit time in which a received signal is despread.

A reception level at a timing E1 is measured by despreading a received signal using a spread code replica at the timing E1. The timing E1 is set to the timing of the resolution for one chip, for example, the timing of ¼ resolution.

After the measurement at the timing E1, the one resolution timing is shifted, and the reception level is measured for the shifted timing. That is, the reception levels of the timings E2, E3, E4, . . . in FIG. 12 are sequentially measured. The frequency L of the measurement is the value determined by the search window size when a delay profile is generated in the multi-path search range.

The delay profile is thus generated by the L measured reception levels and the spread code replica.

FIG. 13 shows the configuration of the apparatus for use with the above mentioned conventional path detecting method. As shown in FIG. 13, the path detection apparatus is configured by despreading means 12, spread code replica generation means 14, a storage unit 16, highest reception level detection means 22, path detection means 4–28 and path masking means 30.

For input into the despreading means 12, a high frequency signal received by an antenna 11 is down-converted by a high frequency reception circuit 13, and a received signal obtained by performing a A/D conversion by a A/D conversion circuit 15 on the down-converted signal is provided. The received signal is provided for a finger 17, and the finger 17 outputs a signal (demodulated signal) despread based on the paths to be rake-combined (described later). The demodulated signal is provided for a rake reception circuit 19 and rake-combined. The rake-combined signal is provided for the circuit which regenerates received data not shown in the attached drawings.

In the despreading means 12 for receiving the received signal, the reception levels of a delay profile are sequentially generated using the spread code replica provided by the spread code replica generation means 14. The sequentially generated reception levels of the delay profile are stored in the storage unit 16.

The highest reception level detection means 22 reads the delay profile stored in the storage unit 16, and detects a path having the highest reception level as a reference path using the delay profile (SC1 shown in FIG. 14).

The path masking means 30 performs a masking process on the paths within ±¾ chip from the path to be rake-combined (SC2 shown in FIG. 14).

The path detection means 4–28 sets the reference path detected by highest reception level means 22 as a path to be rake-combined (SC3 shown in FIG. 14).

If the paths to be rake-combined for respective fingers have not been detected before this process (N in SC4 shown in FIG. 14), the highest reception level detection means 22 defines as a new reference path the path having the highest reception level in the paths having the reception levels lower than the reception level of the current reference path, thereby returning control to the process in step SC2 (SC5 shown in FIG. 14).

The above mentioned processes in steps SC2 to SC5 are repeated until the paths to be rake-combined for respective fingers can be detected.

When the paths to be rake-combined for respective fingers are detected (Y in SC4 shown in FIG. 4), the process of detecting a path terminates.

The detected paths are rake-combined for respective fingers by the rake reception circuit 19 after the detection.

The above mentioned conventional path detecting method detects N (N indicates the number of fingers) paths from the highest reception level sequentially to lower reception levels in the generated delay profile as the paths to be rake-combined.

Therefore, if the delay profile is, for example, as shown in FIG. 15 (the horizontal axis shown in FIG. 15 indicates time with a scale indicating 5 chips, and 24 dots of reception levels measured by ¼ chip resolution in one chip, and the vertical axis indicates a reception level (code correlation value)), and the peaks of the reception levels of the paths to be correctly rake-combined are F1, F2, and F3. The peaks relating to the interference of noise and fading or relating to code correlation are F4 and F5. Additionally, the peak relating to the interference between the path of the peak F1 and the path of the peak F2 appears as F6. Under the condition, if the number N of the fingers is F6, then the peaks F1 to F6 are all detected as the paths to be rake-combined. Therefore, the paths of the peaks F4 to F6 which are not to be rake-combined are misconceived as the paths to be rake-combined, thereby lowering the reception characteristic.

The ±n (n indicates a natural number determined by the resolution when a delay profile is generated) paths from the path detected as the path to be rake-combined are masked. Therefore, although the paths are to be effectively rake-combined, they are excluded.

Japanese Patent Laid-Open No. 2000-115030 (first well-known reference) discloses a CDMA reception device for reducing the deterioration of the reception characteristic by avoiding frequent switch of path timings obtained in the above mentioned conventional path detecting method.

That is, as shown in FIG. 16, the high frequency signal received by the antenna 11 is down-converted by the high frequency reception circuit 13, the signal output from the high frequency reception circuit 13 is A/D converted by the A/D conversion circuit 15, and the A/D converted received signal is provided for a sliding correlator 60.

The sliding correlator 60 generates a delay profile. A delay profile power addition unit 62 performs the process of leveling the path fluctuation by the fading, etc. on the generated delay profile, and an arithmetic unit 64 multiplies the delay profile on which the leveling process has been performed by a weight function from a status weight unit 66. A correlation peak position detection unit 68 which receives the weighted delay profile detects a path timing. The detected path timing is provided for a rake path assignment unit 70. The rake path assignment unit 70 assigns a path position to the finger 17, and sets a weight function. The method of setting a weight function by the rake path assignment unit 70 is to increase a peak value in the current path assignment position.

The arithmetic unit 64, the status weight unit 66, the correlation peak position detection unit 68, and rake path assignment unit 70 are in a DSP 74, the program stored in control memory 72 is read by the program execution unit (not shown in the attached drawings) of the DSP 74, and the program is executed therein to perform the function.

The above mentioned settings of a weight function works such that a path assigned to the finger portion can be set at a higher level.

Therefore, although a state in which path timings frequently switch occurs, the switch can be avoided.

The method of detecting a path timing disclosed in the above mentioned first well-known reference is a method of detecting paths to be rake-combined for respective fingers from a generated delay profile in order from the highest reception level as shown in steps SD1 to SD4 shown in FIG. 22.

Therefore, the method of detecting a path timing disclosed in the above mentioned first well-known reference is the same as the above mentioned conventional path detecting method, and there is the above mentioned technological problem.

Japanese Patent Laid-Open No. 10-336072 (second well-known reference) discloses a technological means for solving the above mentioned problem.

The rake receiver disclosed by the second well-known reference is configured as shown in FIG. 18, and includes the despreading means 12, spread code replica generation means 14, a storage unit 16, highest reception level detection means 22 lowest reception level detection means 52, first multiplication means 54, second multiplication means 56, the path masking means 30, and path detection means 5–28.

A received signal A/D converted by the A/D conversion circuit 15 shown in FIG. 13 is provided as input into the despreading means 12 as shown in FIG. 13.

In the despreading means 12 which receives the received signal, the reception levels of the delay profile are sequentially generated using the spread code replica provided by the spread code replica generation means 14. The sequentially generated reception levels of the delay profile are stored in the storage unit 16.

The highest reception level detection means 22 reads the delay profile stored in the storage unit 16, and detects the highest reception level using the delay profile. The lowest reception level detection means 52 reads the delay profile stored in the storage unit 16, and detects the lowest reception level using the delay profile. The first multiplication means 54 computes a first threshold G1 by multiplying the highest reception level detected by the highest reception level detection means 22 by a first threshold coefficient. The second multiplication means 56 computes a second threshold G2 by multiplying the lowest reception level detected by the lowest reception level detection means 52 by a second threshold coefficient (SE1 shown in FIG. 19).

The highest reception level detection means 22 detects the highest reception level using the delay profile stored in the storage unit 16, and also detects a path having the detected highest reception level as a reference path (SE2 shown in FIG. 19).

The path detection means 5–28 determines whether or not the reception level of the reference path detected by the highest reception level detection means 22 is larger than the first threshold G1 output by the first multiplication means 54 and the second threshold G2 output by the second multiplication means 56, and detects the path as a path to be rake-combined when it is larger (Y in SE3 shown in FIG. 19).

The path masking means 30 masks the paths within ±¾ chip from the path defined as the path to be rake-combined (SE4 shown in FIG. 19).

The above mentioned reference path is detected as a path to be rake-combined (SE5 in FIG. 19)

If the paths to be rake-combined for respective fingers have not been detected before the above mentioned process (N in SE6 shown in FIG. 19), the path detection means 5–28 defines as a new reference path the path having the highest reception level in the reception levels lower than the level of the current reference path, thereby returning control to the process in step SE2 (SE7 shown in FIG. 19).

The above mentioned processes in steps SE3 to SE7 are repeated until the paths to be rake-combined for respective fingers can be detected.

When the paths to be rake-combined for respective fingers are detected (Y in SE6 shown in FIG. 19), the path detecting process terminates.

The detected paths for respective fingers are rake-combined after the detection by a rake reception circuit connected to the path detection means 5–28 (refer to 19 shown in FIG. 13).

The path detecting method described in the above mentioned second well-known reference performs on each reference path a masking process of excluding paths within ±¾ chip from the reference path. Therefore, only the paths having the reception levels exceeding the first threshold G1 and the second threshold G2 are detected as paths to be rake-combined as shown in FIG. 20. The horizontal axis shown in FIG. 20 indicates time, and the display is the same as that shown in FIG. 15. The vertical axis indicates a reception level (code correlation value).

Therefore, in the peaks of the reception levels, the paths having the peaks F1, F2, and F3 are detected as the paths to be rake-combined. However, it is possible to determine that the paths having the peaks F4, F5, and F6 in the peaks of the reception levels are not to be rake-combined.

Nevertheless, when a delay profile contains the paths to be rake-combined having reception levels between the reception levels H1 and H2 as shown in FIG. 21, the reception characteristic can be improved by rake-combining the paths having the reception levels H1 and H2 as the paths to be rake-combined. The horizontal axis shown in FIG. 21 indicates time with a scale indicating ¼ chip. The vertical axis indicates a reception level (code correlation value).

However, in the path detecting method described in the above mentioned second well-known reference, the highest reception level and the lowest reception level are detected as mentioned above, the first threshold G1 and the second threshold G2 are computed from these reception levels, it is determined whether or not the highest reception level, in the above mentioned example, the reception level H1, is larger than the first threshold G1 and the second threshold G2, and the path having the reception level H1 is determined to be a path to be rake-combined. However, since the paths within ±¾ chip from the path having the reception level H1 are masked (the shadowed portion shown in FIG. 21 refers to a masked portion), the reception level H2 which is the second highest level following the reception level H1 is removed from the levels of the paths to be rake-combined, thereby failing in improving the reception characteristic. That is, there is the problem that the reception characteristic is lowered than in the case in which the paths to be rake-combined includes both reception levels H1 and H2.

When the paths to be rake-combined (having the reception levels I2 and I3 or the reception level between the reception levels I2 and I3) exist in the timing close to the path to be rake-combined (reception level I1) in the delay profile as shown in FIG. 22, and interfere with one another, the path having the reception level I1 is detected as a path to be rake-combined in the path detecting method described in the second well-known reference. However, the paths having the reception levels I2 and I3 or the reception level between the reception levels I2 and I3 (the shadowed portion shown in FIG. 22 refers to the masked portion) are also excluded from the paths to be rake-combined in the above mentioned masking process, thereby inevitably lowering the reception characteristic. The horizontal axis shown in FIG. 22 indicates time with a scale indicating ¼ chip. The vertical axis indicates a reception level (code correlation value).

BRIEF SUMMARY OF THE INVENTION

Object of the Invention

The present invention aims at providing a CDMA reception device capable of possibly reducing the misconception of a probable path when the probable path is to be detected in a delay profile.

Summary of the Invention

A path detection apparatus in a CDMA reception device includes: storage means for storing a delay profile; and path detection means for detecting a path by reading the delay profile from the storage means and performing a rake-combining process based on the read delay profile. With the configuration, the path detection means includes reference path detection means for detecting a reference path for detection of a probable path based on the delay profile read from the storage means; and detection means for detecting as a probable path in the rake-combining process a path existing in a path detecting time in which the reception characteristic of the CDMA reception device can be improved from the detecting time of the reference path detected by the reference path detection means.

BRIEF DESCRIPTION OF THE DRAWINGS

The above mentioned and other objects, features and advantages of this invention will become more apparent by reference to the following detailed description of the invention taken in conjunction with the accompanying drawings, wherein.

DETAILED DESCRIPTION OF THE INVENTION

The embodiments of the present invention are described below by referring to the attached drawings. The specific explanation will be given by referring to practical embodiments.

Figure 1:
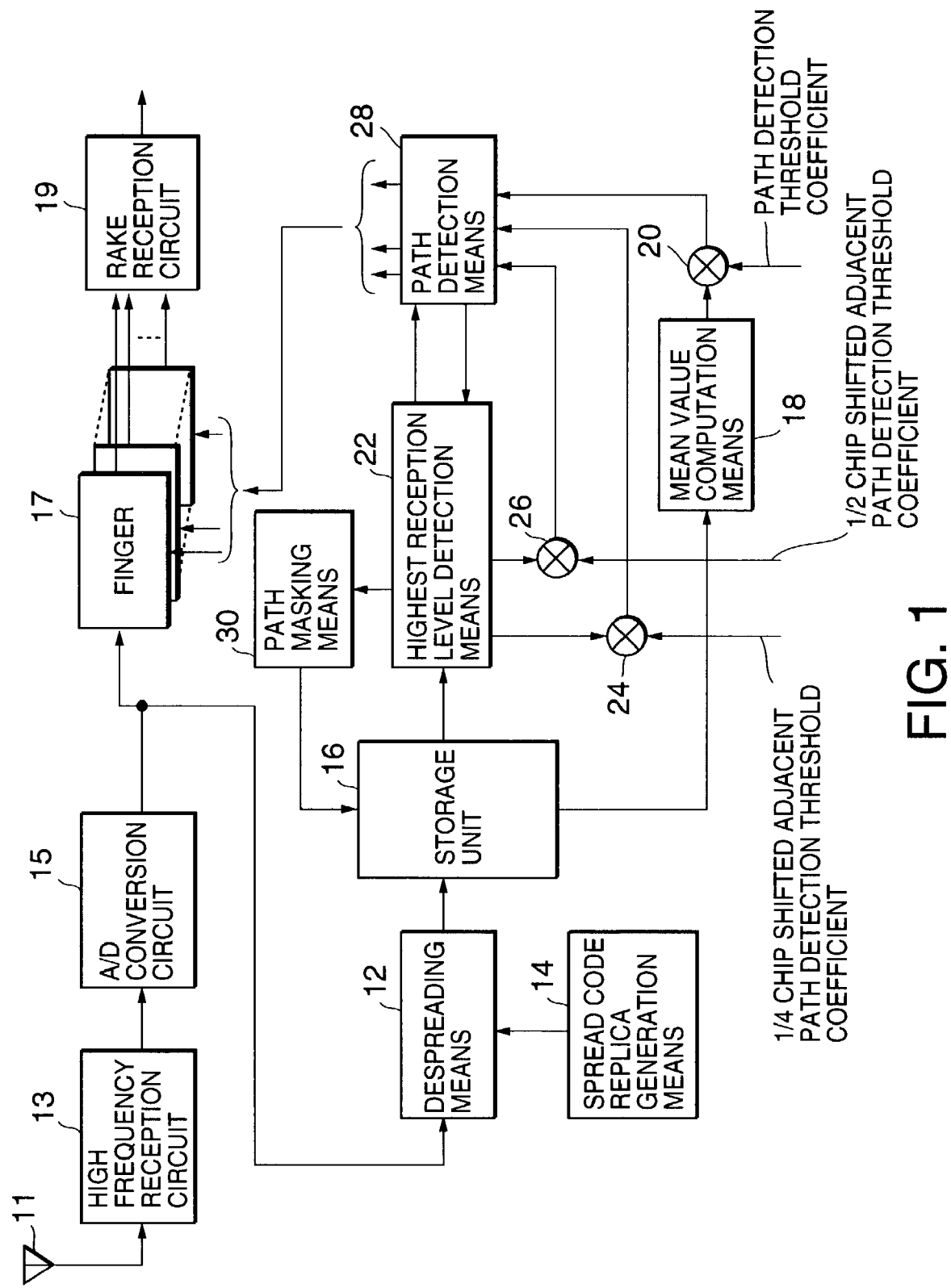
FIG. 1 shows the electric configuration of the path detection apparatus in the CDMA reception device according to a first embodiment of the present invention.
Figure 2:
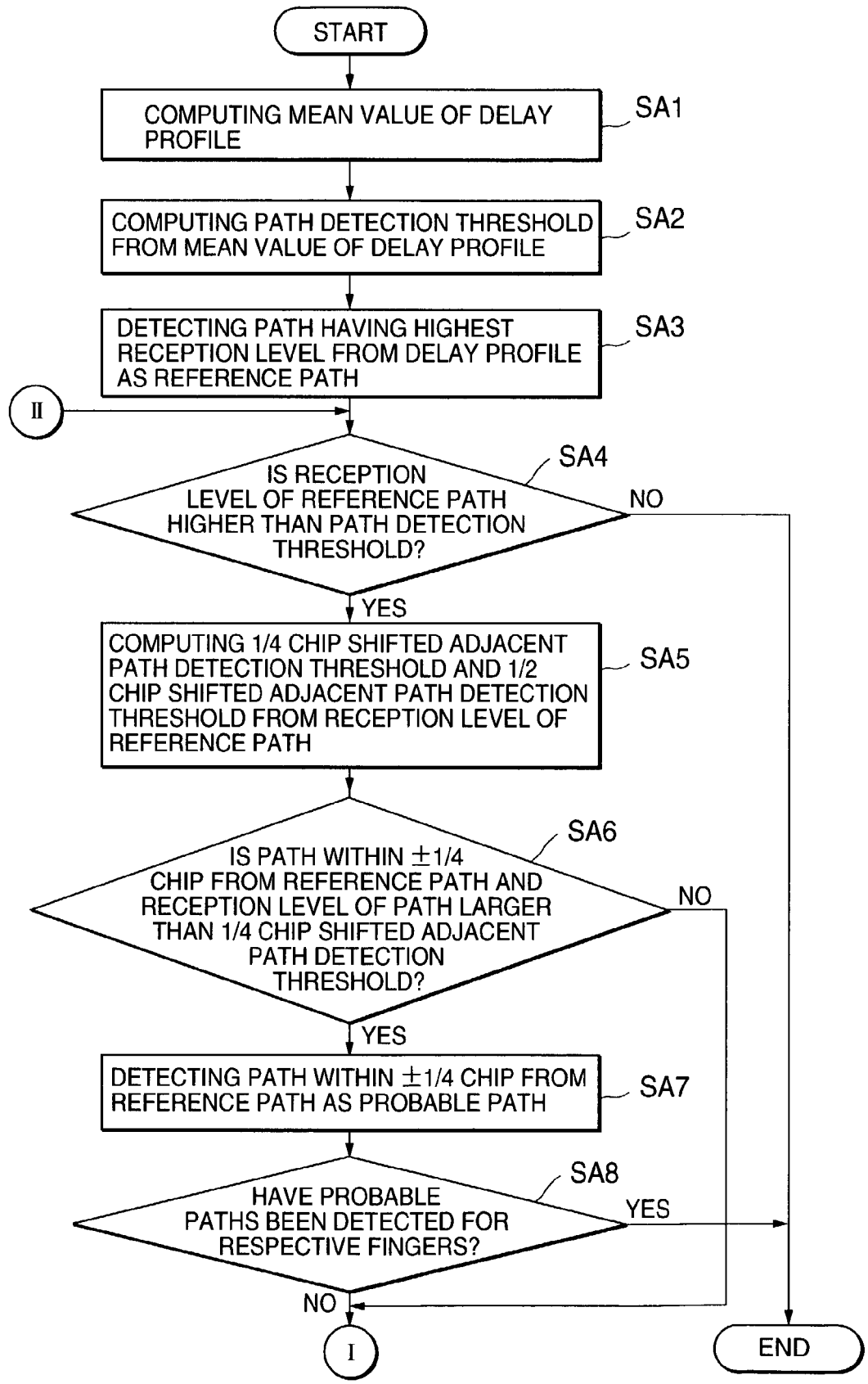
FIG. 2 is a flowchart showing a part of the process procedure of the path detection apparatus.
Figure 3:
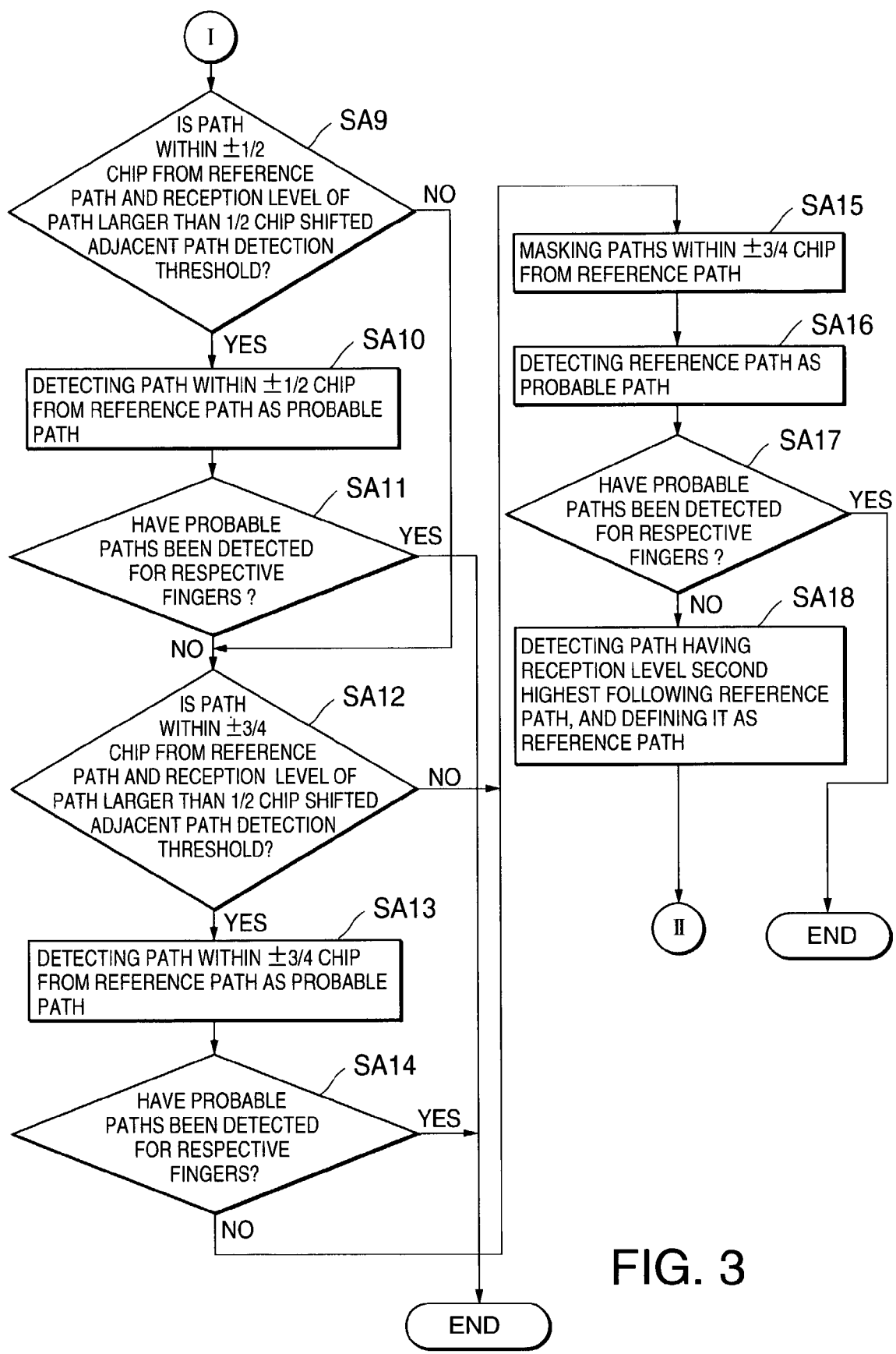
FIG. 3 is a flowchart showing the rest of the process procedure of the path detection apparatus.
Figure 4:
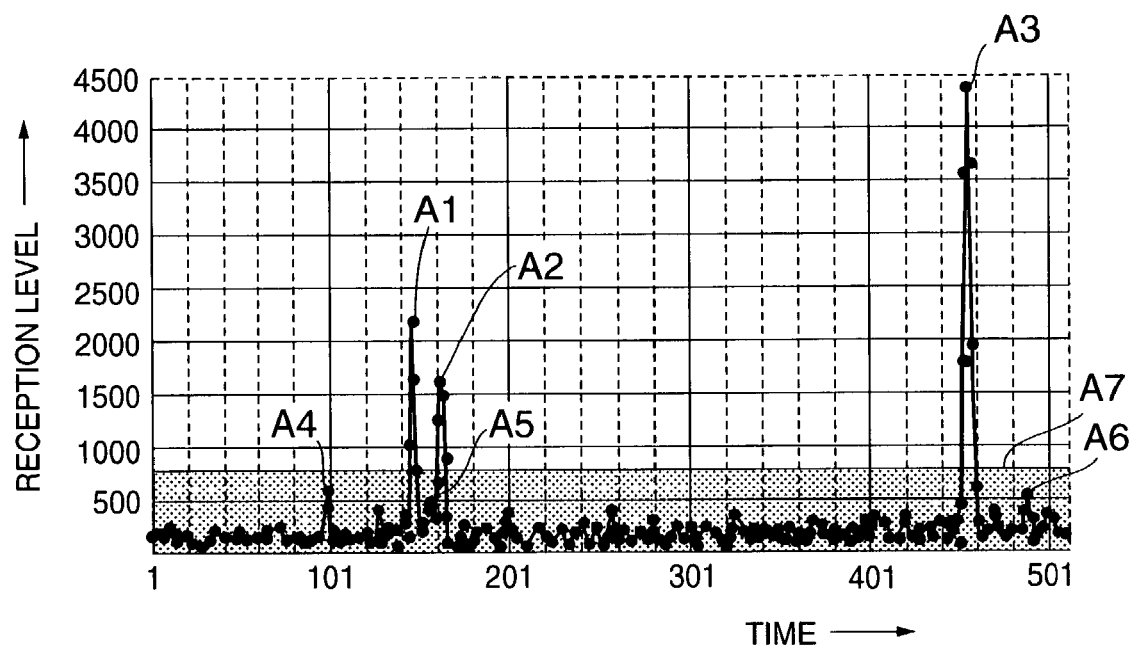
FIG. 4 shows a first example of a delay profile generated by the path detection apparatus.
Figure 5:
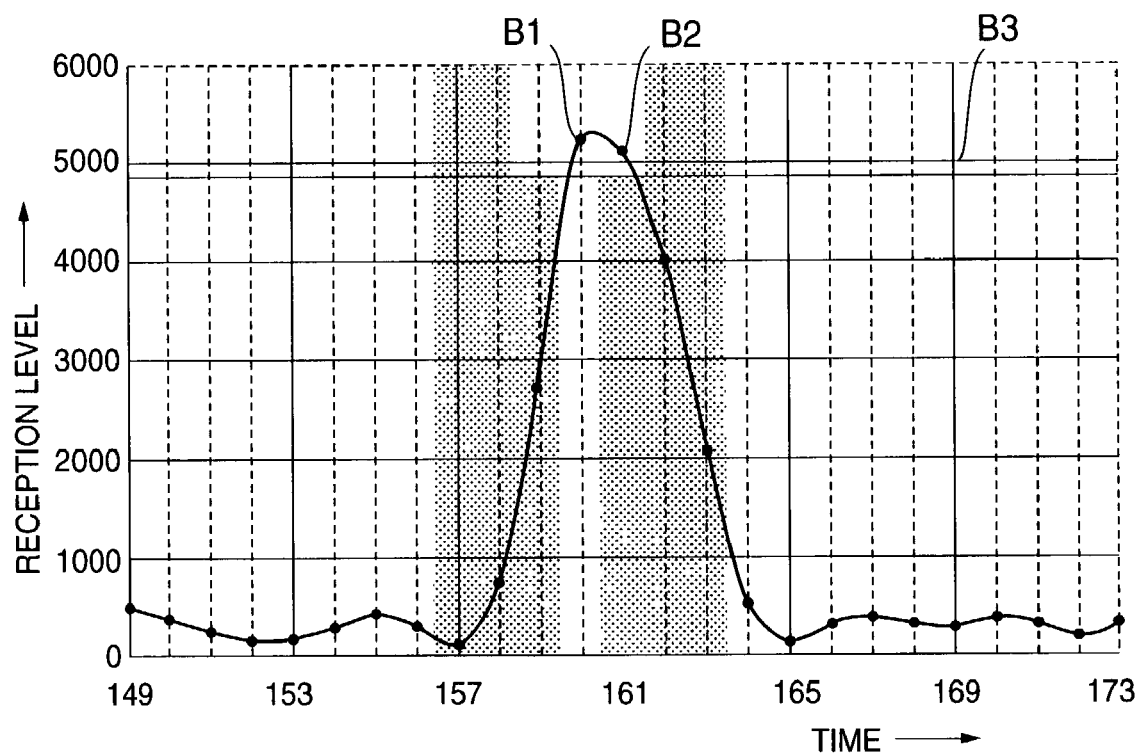
FIG. 5 shows a second example of a delay profile generated by the path detection apparatus.
Figure 6:
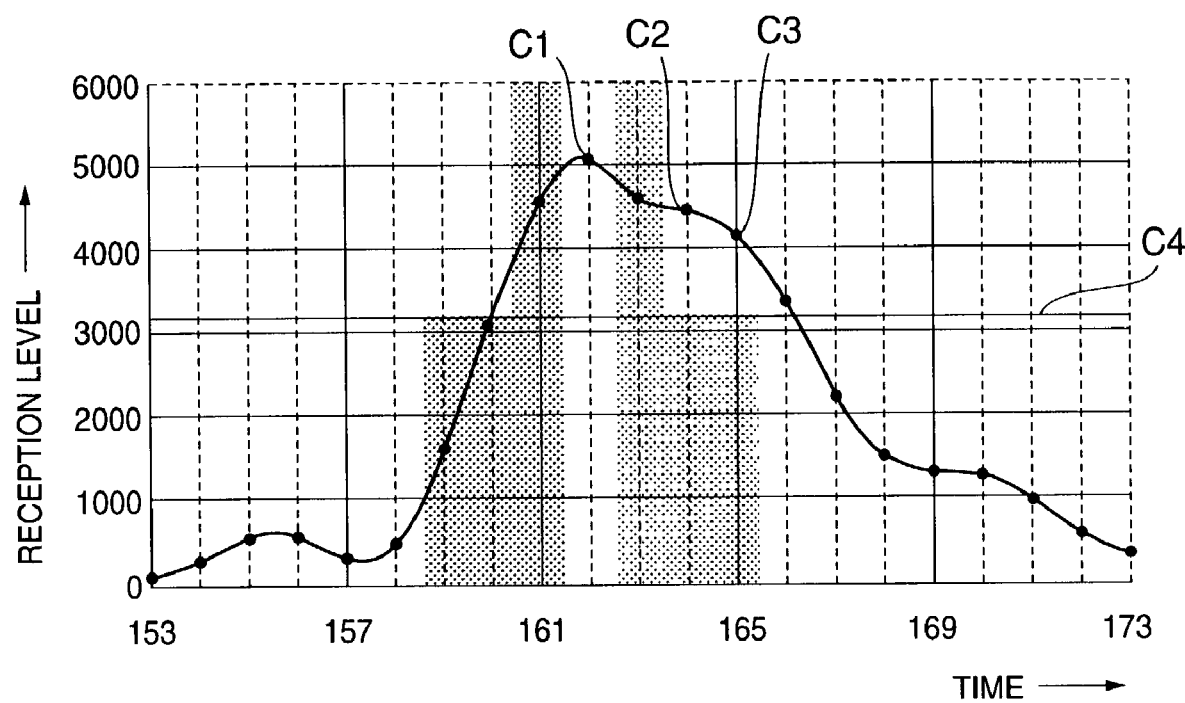
FIG. 6 shows a third example of a delay profile generated by the path detection apparatus.

FIG. 1 shows the electric configuration of the path detection apparatus in the CDMA reception device according to a first embodiment of the present invention. FIG. 2 is a flowchart showing a part of the process procedure of the path detection apparatus. FIG. 3 is a flowchart showing the rest of the process procedure of the path detection apparatus. FIG. 4 shows a first example of a delay profile generated by the path detection apparatus. FIG. 5 shows a second example of a delay profile generated by the path detection apparatus. FIG. 6 shows a third example of a delay profile generated by the path detection apparatus.

The path detection apparatus according to the present embodiment relates to an apparatus capable of possibly reducing the misconception of a probable path when the probable path is to be detected. As shown in FIG. 1, the apparatus comprises the despreading means 12, the spread code replica generation means 14, the storage unit 16, the highest reception level means 18, first multiplication means 20, the highest reception level detection means 22, second multiplication means 24, third multiplication means 26, a path detection means 28, and the path masking means 30.

At the input of the despreading means 12, a high frequency signal received by the antenna 11 is down-converted by the high frequency reception circuit 13, and the down-converted signal is A/D converted by the A/D conversion circuit 15 and provided as a received signal. The received signal is provided for the finger 17, and a signal (demodulated signal) despread based on a probable path described later is output from the finger 17. The demodulated signal is provided for the rake reception circuit 19 and rake-combined, and the rake-combined signal is provided for the circuit for regenerating received data not shown in the attached drawings.

The despreading means 12 despreads a received signal using a received signal, a spread code replica provided by the spread code replica generation means 14, and a timing signal, and sequentially generates the reception levels of a delay profile. In this embodiment, a timing of despreading a received signal is set to ¼ chip resolution. The timing signal is provided by timing generation means not shown in the attached drawings.

The storage unit 16 stores the reception levels of the delay profile sequentially generated by the despreading means 12.

The mean value computation means 18 reads the delay profile stored in the storage unit 16, and computes a mean value.

The first multiplication means 20 computes a path detection threshold by multiplying the mean value of the delay profile computed by the mean value computation means 18 by the path detection threshold coefficient externally provided as a parameter. The path detection threshold coefficient is determined in the CDMA reception device by determining the reception characteristic of the CDMA reception device by determining whether or not the reference path described below is a path to be rake-combined (hereinafter referred to as a probable path), and performing each process described below if it is determined that the path is a probable path. The example of computing the path detection threshold coefficient is given below using a value determined by the simulation of the reception characteristic with the circuit scale of the CDMA reception device taken into account. That is, the path detection threshold coefficient is 3.75.

The highest reception level detection means 22 reads the delay profile stored in the storage unit 16, and detects a path having the highest reception level as a reference path using the delay profile.

The second multiplication means 24 computes a ¼ chip shifted adjacent path threshold by multiplying the reception level of the reference path detected by the highest reception level detection means 22 by a ¼ chip shifted adjacent path threshold coefficient externally provided as a parameter.

The third multiplication means 26 computes a ½ chip shifted adjacent path threshold by multiplying the reception level of the reference path detected by the highest reception level detection means 22 by a ½ chip shifted adjacent path threshold coefficient externally provided as a parameter.

The above mentioned ¼ chip shifted adjacent path detection threshold coefficient and the above mentioned ½ chip shifted adjacent path detection threshold coefficient are path detection threshold coefficients determined by the reception characteristic by discriminating a probable path from a non-probable path in the CDMA reception device. An example of computing these path detection threshold coefficients is given below using a value determined by the simulation of the reception characteristic with the circuit scale of the CDMA reception device taken into account.

That is, ¼ chip shifted adjacent path detection threshold coefficient is 0.9375, and the ½ chip shifted adjacent path detection threshold coefficient is 0.625.

The path detection means 28 determines whether or not the reference path detected by the highest reception level detection means 22 and the paths within ±¾ chip from the reference path are to be defined as probable paths by the path detection threshold computed by the first multiplication means 20, the ¼ chip shifted adjacent path threshold computed by the second multiplication means 24, and the ½ chip shifted adjacent path threshold computed by the third multiplication means 26.

The path masking means 30 masks the reference path detected by the highest reception level means 22 and the paths within ±¾ chip from the reference path detected by the path detection means 28.

Then, by referring to FIGS. 1 to 6, the operations according to the embodiment are described below.

The high frequency signal received by the antenna 11 of the CDMA reception device is down-converted by the high frequency reception circuit 13, and a down-converted signal is A/D converted by the A/D conversion circuit 15. The A/D converted received signal is provided for a plurality of fingers 17. The fingers 17 provide the rake reception circuit 19 with a signal despread based on a probable path provided by the path detection means 28 for each finger.

The despreading process based on a probable path in the finger 17 can be performed by providing the rake reception circuit 19 with a despread signal as a signal of a path to be rake-combined by referring to the reception level of the despread signal after receiving the probable path in one finger, and the probable path can be used in the despreading process in one or more fingers.

Furthermore, when the above mentioned received signal and timing signal are provided for the despreading means 12, and when the spread code replica is provided from the spread code replica generation means 14 to the despreading means 12, the despreading means 12 despreads the received signal at each time of the timing signal, and sequentially generates the reception levels forming the delay profile. The sequentially generated reception levels are sequentially stored in the storage unit 16.

The spread code replica is represented by a sequence of binary signals, and the minimum basic unit time of the time period indicating either 1 or 0 is referred to as a chip. The above mentioned timing signal is provided by the timing generation means not shown in the attached drawings, and refers to ¼ chip resolution in this embodiment.

The mean value computation means 18 reads the delay profile stored in the storage unit 16, and computes the mean value (SA1 shown in FIG. 2). The first multiplication means 20 multiplies the mean value output from the mean value computation means 18 by a path detection threshold coefficient, and outputs a path detection threshold (SA2 shown in FIG. 2).

The highest reception level detection means 22 reads the delay profile from the storage unit 16, computes the path having the highest reception level, and defines the path as a reference path (SA3 shown in FIG. 2).

Upon receipt of the reference path, the path detection means 28 determines whether or not the reception level of the reference path exceeds the path detection threshold output by the first multiplication means 20 (SA4 shown in FIG. 2). When the reception level of the reference path is lower than the path detection threshold (N in SA4 shown in FIG. 2), the path detecting process terminates.

The path detecting process terminates for the following reason.

That is, described below is the case in which a delay profile is generated as shown in FIG. 4. In FIG. 4, the horizontal axis indicates time with a scale indicating 5 chips. The vertical axis indicates a reception level (code correlation value).

The peaks A4 and A6 in the delay profile are peaks indicating the interference by noise or fading, or peaks indicating code correlation. That is, the paths are not probable paths. The peak A5 exists between the peak A1 of a probable path and the peak A2 of a probable path, and is generated by the interference between the peaks A1 and A2. The path with this peak is not a probable path.

Nevertheless, in the conventional path detecting method of detecting probable paths in order from the highest reception level of a delay profile, the peaks A4, A5, and A6 are also detected as probable paths. As a result, the reception characteristic is lowered.

However, in determining in step SA4 whether or not the reception level of the reference path has exceeded the path detection threshold (A7 shown in FIG. 3), the peaks A4, A5, and A6 shown in FIG. 3 are equal to or lower than the path detection threshold A7. Therefore, the peaks A4, A5, and A6 are not detected as probable paths. That is, the deterioration of the reception characteristic can be avoided.

Since the determination in step SA4 is negative as described above, the shadowed portion in FIG. 4 is masked in detecting a path.

When the reception level of the reference path in the determination in step SA4 shown in FIG. 2 exceeds the above mentioned path detection threshold (Y in SA4 shown in FIG. 2), the second multiplication means 24 computes a ¼ chip shifted adjacent path detection threshold by multiplying the reception level of the reference path output by the highest reception level detection means 22 by the ¼ chip shifted adjacent path detection threshold coefficient, and the second multiplication means 26 computes a ½ chip shifted adjacent path detection threshold by multiplying the reception level of the reference path output by the highest reception level detection means 22 by the ½ chip shifted adjacent path detection threshold coefficient (SA5 shown in FIG. 2).

After computing these path detection thresholds, the path detection means 28 determines whether or not there is a path within ±¼ chip from the reference path and the reception level of the path exceeds the ¼ chip shifted adjacent path detection threshold (SA6 shown in FIG. 2). If it is determined in the affirmative (Y in SA6 shown in FIG. 2), then the path within ±¼ chip from the reference path is detected as a probable path, thereby counting up the number of probable paths by 1 (SA7 shown in FIG. 2).

Then, it is determined whether or not the number of detected probable paths equals the number of fingers (SA8 shown in FIG. 2). If it is determined in the affirmative (Y in SA8 shown in FIG. 2), the path detecting process on the delay profile stored in the storage unit 16 at the time terminates.

If it is determined in the negative in step SA6 shown in FIG. 2 (N in SA6 shown in FIG. 2), or if it is determined in the negative in step SA8 (N in SA8 shown in FIG. 2), then the path detection means 28 determines whether or not there is a path within ±½ from the reference path and the reception level of the path exceeds the ½ chip shifted adjacent path detection threshold (SA9 shown in FIG. 3). If it is determined in the affirmative (Y in SA9 shown in FIG. 3), then the path within ±½ from the reference path is detected as a probable path, and the number of probable paths is counted up by 1 (SA10 shown in FIG. 3).

Then, it is determined whether or not the number of detected probable paths equals the number of fingers (SA11 shown in FIG. 3). If it is determined in the affirmative (Y in SA11 shown in FIG. 3), the path detecting process on the delay profile stored in the storage unit 16 in this case terminates.

If it is determined in the negative in step SA9 shown in FIG. 3 (N in SA9 shown in FIG. 3), or if it is determined in the negative in step SA11 shown in FIG. 3 (N in SA11 shown in FIG. 3), then the path detection means 28 determines whether or not there is a path within ±¾ from the reference path and the reception level of the path exceeds the ½ chip shifted adjacent path detection threshold (SA12 shown in FIG. 3). If it is determined in the affirmative (Y in SA12 shown in FIG. 3), then the path within ±¾ from the reference path is detected as a probable path, and the number of probable paths is counted up by 1 (SA13 shown in FIG. 3).

Then, it is determined whether or not the number of detected probable paths equals the number of fingers (SA14 shown in FIG. 3). If it is determined in the affirmative (Y in SA14 shown in FIG. 3), the path detecting process on the delay profile stored in the storage unit 16 in this case terminates.

If it is determined in the negative in step SA12 shown in FIG. 3 (N in SA12 shown in FIG. 3), or if it is determined in the negative in step SA14 shown in FIG. 3 (N in SA14 shown in FIG. 3), then a path masking means 30 masks the paths within ±¾ chip from the reference path (SA15 shown in FIG. 3).

When the masking process is performed, the reference path is detected as a probable path, and the number of probable path is counted up by 1 (SA16 shown in FIG. 3).

In the path detection means 28, it is determined whether or not there is a path within ±¼ chip from the reference path and the reception level of the path exceeds the ¼ chip shifted adjacent path detection threshold B3 (SA6 shown in FIG. 2). Since the paths within ±¼ chip from the reference path are detected as probable paths, the delay profile is generated as, for example, shown in FIG. 5 (the horizontal axis shown in FIG. 5 indicates time with a scale indicating ¼ chip, and the vertical axis indicates a reception level (code correlation value)), and the paths B1 and B2 within ±¼ chip from the path having the highest reception level are detected as probable paths in the process in steps SA6 and SA7. However, no probable paths are detected in the processes in steps SA9 and SA10, or in steps SA12 and SA13.

Thus, since the paths B1 and B2 are detected as probable paths, the reception characteristic can be improved.

Since it is determined in the negative in step SA9, it is determined in the negative in step SA11, and the masking process is performed in step SA15, the shadowed portion shown in FIG. 5 is masked in detecting a path.

In addition, the delay profile is generated as, for example, shown in FIG. 6 (the horizontal axis shown in FIG. 6 indicates time with a scale indicating ¼ chip, and the vertical axis indicates a reception level (code correlation value)), and the path C2 satisfying the above mentioned determination condition within ±½ chip from the path (C1) at the highest reception level is detected as a probable path in the process in steps SA9 and SA10, and the path C3 within ±¾ chip from the path (C1) having the highest reception level and satisfying the above mentioned determination condition is detected as a probable path in the processes in steps SA12 and SA13. Therefore, the reception characteristic can be improved.

Since it is determined in the negative in step SA6, and it is determined in the affirmative in step SA9 and the detection is performed in step SA10, and it is determined in the affirmative in step SA12 and the detection is performed in step SA13, the shadowed portion shown in FIG. 6 is masked in the path detecting process.

Thus, it is determined whether or not the number of the detected probable paths equals the number of fingers (SA17 shown in FIG. 3).

If it is determined in the affirmative (Y in SA17 shown in FIG. 3), the path detecting process terminates. However, it is normal that it is determined several times in the negative in step SA17.

When it is determined in the negative in step SA17 (N in SA17 shown in FIG. 3), the highest reception level detection means 22 detects a path having the highest reception level but lower than the reception level of the reference path, and the path is defined as a new reference path (SA18 shown in FIG. 3).

Thus, the path detecting process in steps SA4 to SA18 is started on the determined reference path.

If the determination is made in steps SA8, SA11, and SA14, the path detecting process in steps SA4 to SA18 is repeated several times, and it is determined in the affirmative in step SA17, then the path detecting process terminates, and the detected paths, that is, probable paths are provided for the fingers 17.

The probable paths are used in despreading in the fingers 17, and the despread signal is provided for the rake reception circuit 19 for rake-combination.

The rake-combined signal is provided for demodulation of received data as in the conventional technology.

The comparison of performance between the path detection apparatus of the second well-known reference described above in the Description of the Prior Art and the path detection apparatus according to the present invention is shown in table 1 below.

TABLE 1

| Environment/<br>12.2 kbps DCH | Second<br>well-known<br>reference [dB] | First embodiment<br>[dB] | Improvement of<br>characteristic<br>[dB] |
| --- | --- | --- | --- |
| STATIC | −18.1 | −18.2 | 0.1 |
| CASE1 | −15.3 | −16.0 | 0.7 |
| CASE2 | −7.4 | −8.3 | 0.9 |
| CASE3 | −12.8 | −13.0 | 0.2 |
| MOVING | −16.2 | −16.6 | 0.4 |
| BIRTH/DEATH | −13.8 | −13.9 | 0.1 |

Table 1 shows the path detection apparatus of the second well-known reference tested in the environment regulated on pages 27 to 30 of 3GPP (3rd Generation Partnership Project) TS 25.101 V3.5.0. "UE Radio Transmission and Reception (FDD) (Release 1999)" (issued in December, 2000) (hereinafter referred to as 3GPP) and the BLER (block error ratio) of the path detection apparatus according to the present invention; and the extent of the characteristic improvement of the BLER of the path detection apparatus according to the present invention to the path detection apparatus according to the second well-known reference.

The 'Environment @12.2 kbps DCH' in table 1 refers to the test environment condition of the communications speed of 12.2 kbps of a channel DCH defined in 3GPP. The 'STATIC' refers to Test 1 in 3GPP, chapter 8.2.3.1 (p. 27).

The 'CASE1' refers to Test 1 in 3GPP, chapter 8.3.1.1 (p. 28), the 'CASE2' refers to Test 5 in 3GPP, chapter 8.3.1.1 (p. 28), the 'CASE3' refers to Test 9 in 3GPP, chapter 8.3.1.1 (p. 28), the 'MOVING' refers to Test 1 in 3GPP, chapter 8.4.1.1 (p. 29), and the 'BIRTH/DEATH' refers to Test 1 in 3GPP, chapter 8.5.1.1 (p.30).

Thus, with the configuration according to the embodiment, when the path detecting process is entered with the path having the highest reception level in the delay profile defined as the reference path, the mean value of the delay profile is multiplied by the path detection threshold coefficient, and the path having the reception level exceeding the path detection threshold obtained in the multiplication is defined as a probable path. Therefore, although the interference or code correlation by noise and fading raises the reception level, the path having the reception level is not misconceived as a probable path, thereby improving the reception characteristic.

Furthermore, the path having the successive highest reception level in the delay profile is defined as a reference path, the reception level of the reference path is multiplied by the ¼ chip shifted adjacent path threshold coefficient to obtain the ¼ chip shifted adjacent path threshold, and the path within ±¼ chip from the reference path and having the reception level exceeding the ¼ chip shifted adjacent path threshold is defined as a probable path. Therefore, when there is a probable path between two reception level computing times (sampling times), the reception levels at the above mentioned two sampling times exceed the ¼ chip shifted adjacent path threshold, and the path having the reception level can be defined as a probable path.

The reception characteristic can be improved when the delay profile is the delay profile shown in FIG. 5.

Furthermore, the path having the successive highest reception level in the delay profile is defined as a reference path, the reception level of the reference path is multiplied by the ½ chip shifted adjacent path threshold coefficient, and the path within ±½ chip or ±¾ chip from the reference path and having the reception level exceeding the ½ chip shifted adjacent path threshold is defined as a probable path. Therefore, a path within 1 chip from the reception level computing time, existing in the time area shifted by two or more chip resolution, and exceeding the ½ chip shifted adjacent path threshold coefficient can be defined as a probable path.

The reception characteristic can be improved when the delay profile is the delay profile shown in FIG. 6.

Figure 7:
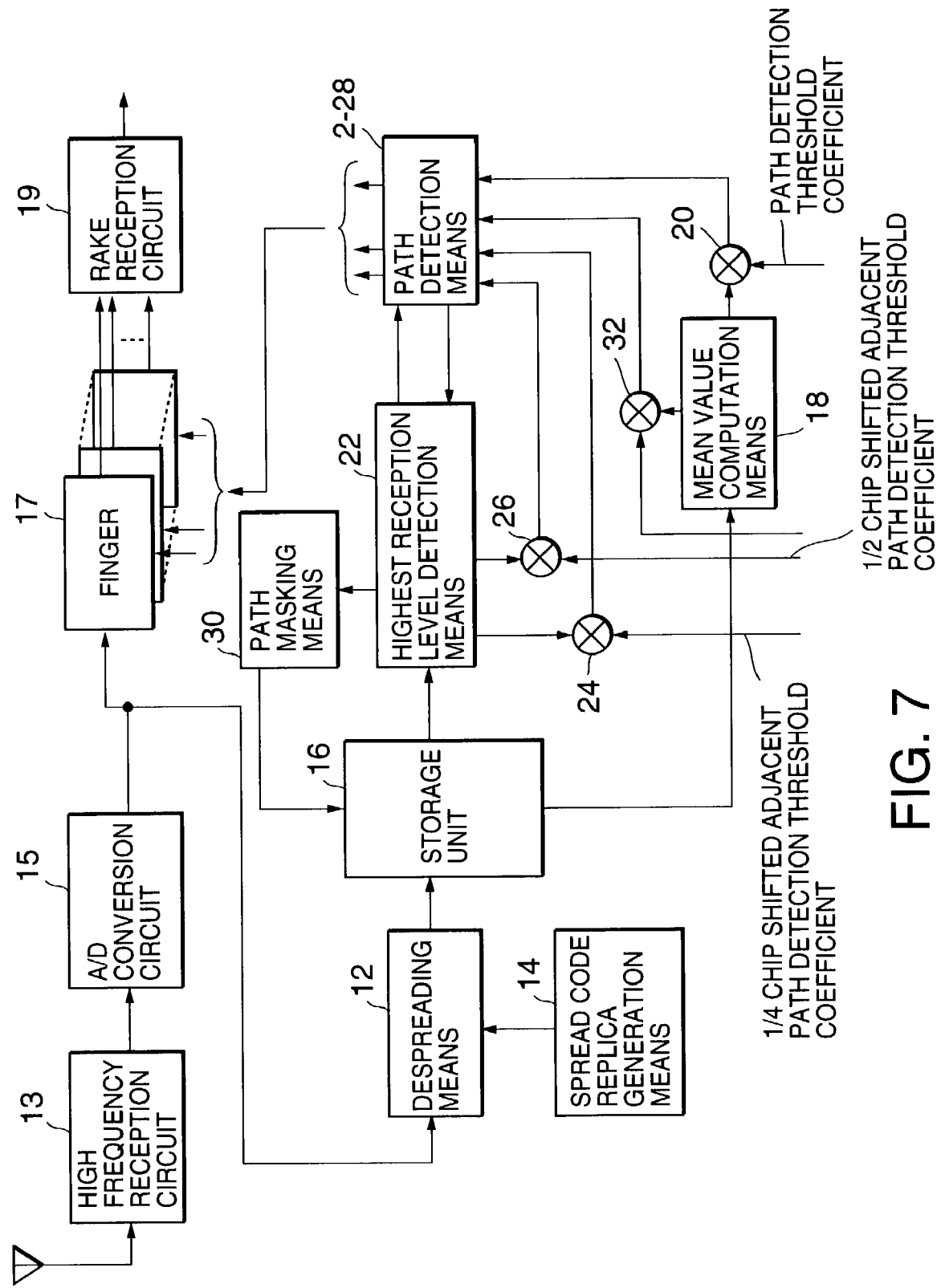
FIG. 7 shows the electric configuration of the path detection apparatus in the CDMA reception device according to a second embodiment of the present invention.
Figure 8:
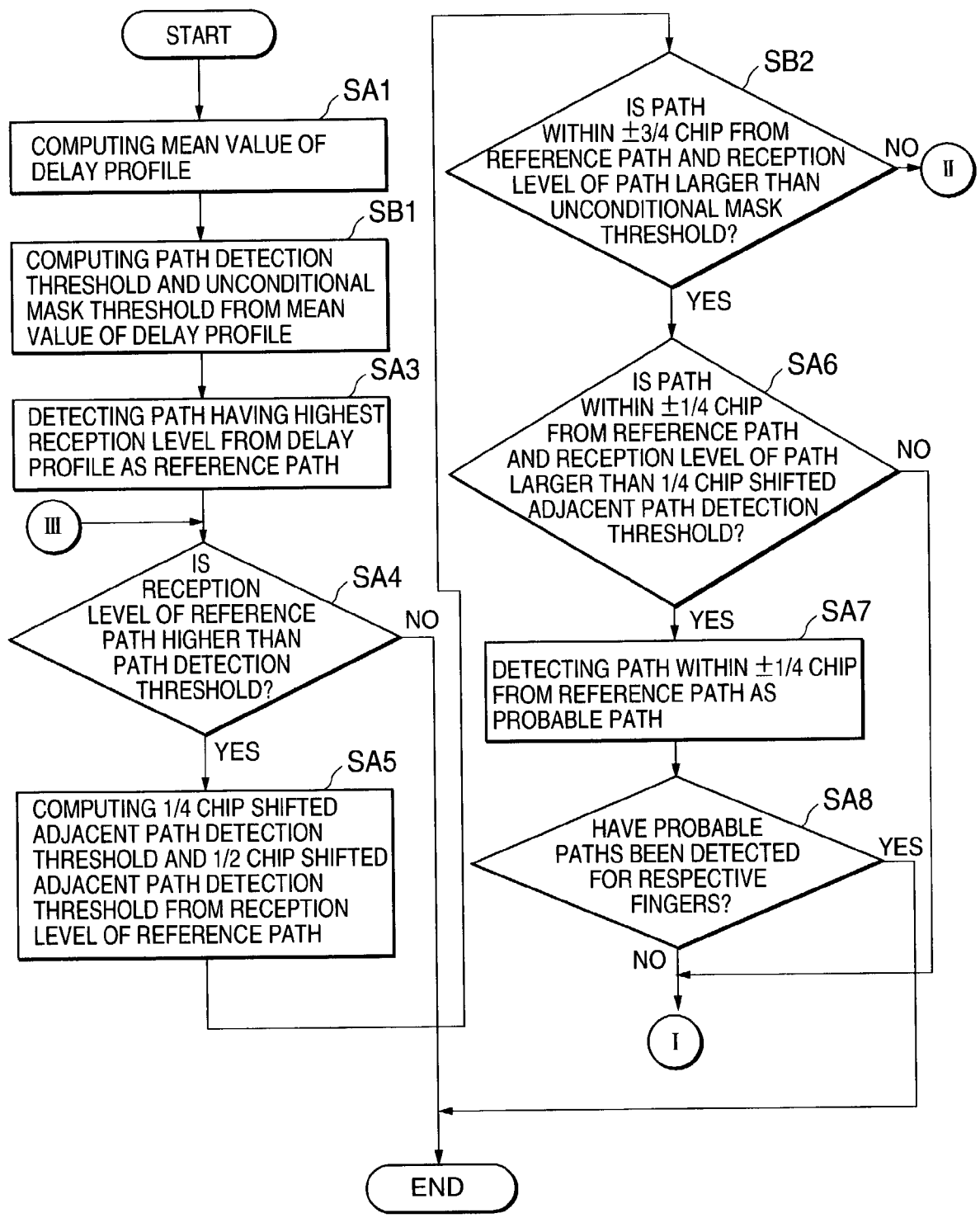
FIG. 8 is a flowchart showing a part of the process procedure of the path detection apparatus.
Figure 9:
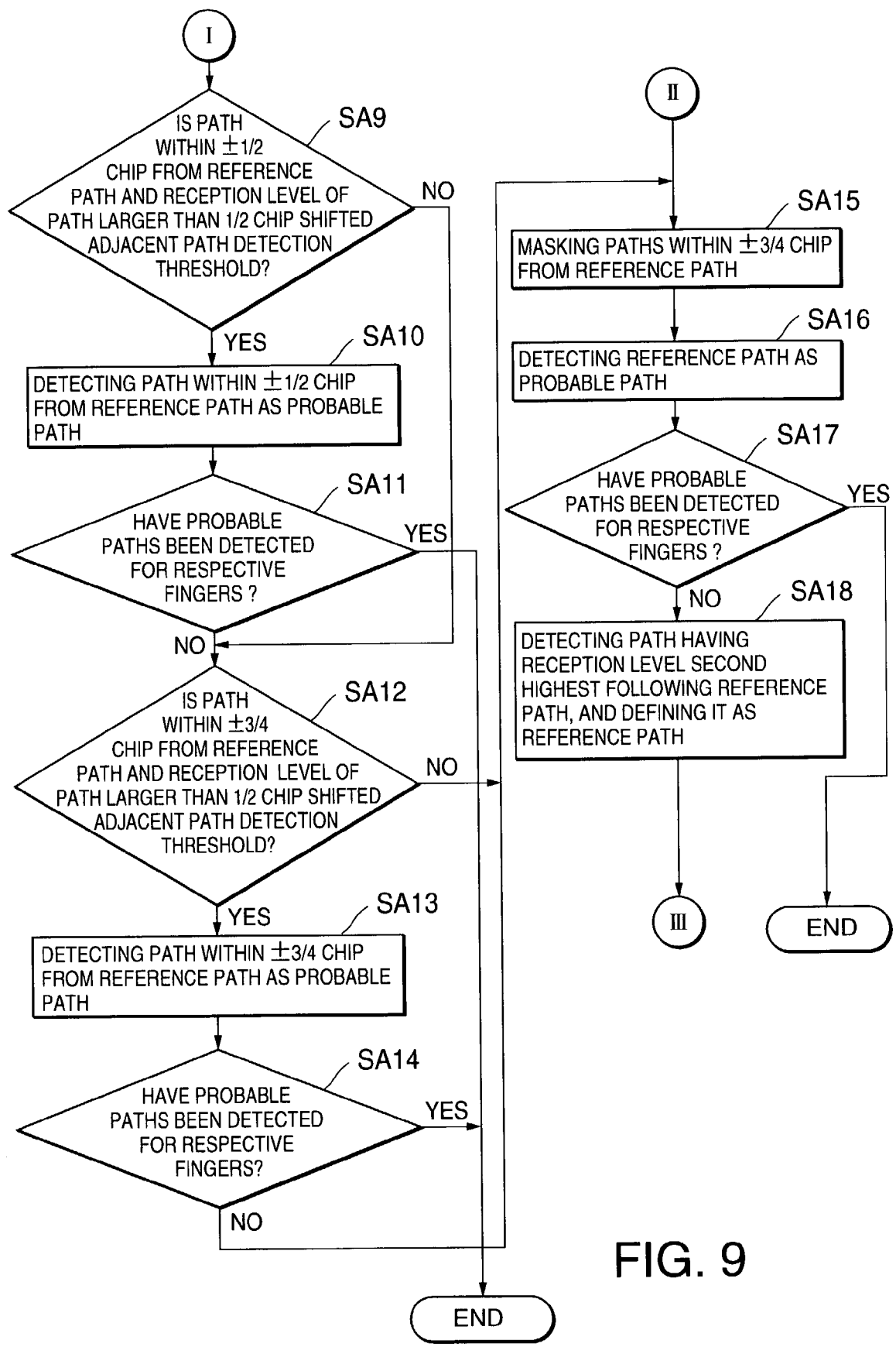
FIG. 9 is a flowchart showing the rest of the process procedure of the path detection apparatus.
Figure 10:
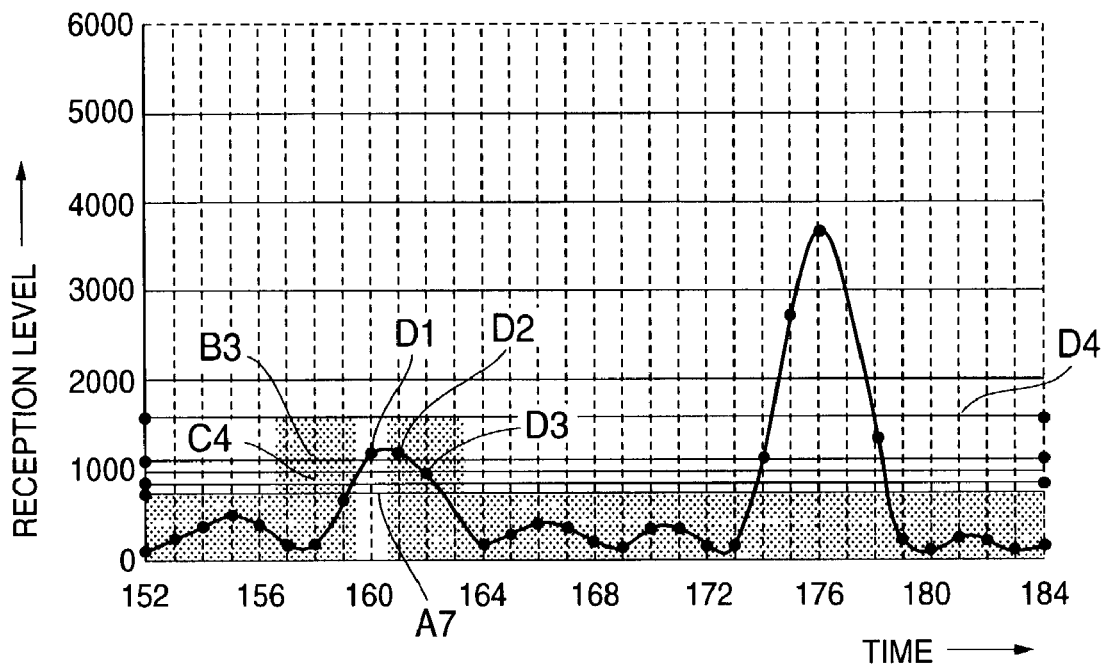
FIG. 10 shows an example of a delay profile generated by the path detection apparatus.

FIG. 7 shows the electric configuration of the path detection apparatus in the CDMA reception device according to a second embodiment of the present invention. FIG. 8 is a flowchart showing a part of the process procedure of the path detection apparatus. FIG. 9 is a flowchart showing the rest of the process procedure of the path detection apparatus. FIG. 10 shows an example of a delay profile generated by the path detection apparatus.

The configuration according to the embodiment is different from the first embodiment in that an unconditional mask threshold is computed from the mean value of the delay profile, and the unconditional mask threshold is provided in detecting a path.

That is, a fourth multiplication means 32 for computing an unconditional mask threshold by multiplying a mean value output by the mean value computation means 18 of the first embodiment by an unconditional mask threshold coefficient is provided.

The unconditional mask threshold coefficient is externally provided as a parameter, and is determined by the reception characteristic of the CDMA reception device to exclude the path which is misconceived in the path detecting method with the configuration of the CDMA reception device according to the first embodiment. An example of computing the unconditional mask threshold coefficient is given below using a value determined by the simulation of the reception characteristic with the circuit scale of the CDMA reception device taken into account. That is, the path detection threshold coefficient is 8.

Therefore, a path detection means 2 to 28 in the embodiment detects a path with the unconditional mask threshold in the path detection condition according to the first embodiment taken into account, and provides a probable path for the finger 17.

That is, as in the first embodiment, the path detection means 2–28 first determines whether or not the reception level of the reference path exceeds the path detection threshold, performs the path detecting process as in the first embodiment if there is a path within ±¾ chip from the reference path and the reception level of the path exceeds an unconditional mask threshold, and immediately performs a masking process on a path within ±¾ chip from the reference path if the reception level does not exceed it, thereby performing the path detecting process of detecting the reference path as a probable path.

The configuration of each portion of the embodiment excluding the above mentioned configuration is the same as that of the first embodiment. Therefore, each portion is assigned the same reference code as the first embodiment, and the detailed explanation is omitted here.

The operation of the embodiment is described below by referring to FIGS. 7 to 10.

The operation according to the embodiment is the same as the operation according to the first embodiment except the following two differences.

The first difference is that after a mean value of the delay profile is computed by the mean value computation means 18, the fourth multiplication means 32 computes an unconditional mask threshold from the mean value (step SB1 shown in FIG. 8). In step SB1, as in the first embodiment, a path detection threshold is also computed.

The second difference is that after the second multiplication means 24 computes the ¼ chip shifted adjacent path detection threshold, and the third multiplication means 26 computes the ½ chip shifted adjacent path detection threshold, it is determined whether or not there is a path within ±¾ chip from the reference path and the reception level of the path exceeds an unconditional mask threshold (SB2 shown in FIG. 8).

The path detecting process according to the embodiment except these differences is described by referring to the first embodiment. Therefore, in step SB1 which is the difference from the first embodiment, an unconditional mask threshold is computed. In step SB2, the determination as to whether or not a path within ±¾ chip from the reference path and having the reception level exceeding an unconditional mask threshold is explained below.

The mean value computed by the mean value computation means 18 is multiplied by the unconditional mask threshold coefficient by the fourth multiplication means 32, and the unconditional mask threshold is output by the fourth multiplication means 32 (SB1 shown in FIG. 8). The output unconditional mask threshold is provided for the path detection means 2 to 28.

If the reception level of the reference path exceeds the path detection threshold (Y in SA4 shown in FIG. 8), and after the ¼ chip shifted adjacent path detection threshold and the ½ chip shifted adjacent path detection threshold are computed (SA5 shown in FIG. 8), it is determined whether or not the reception level of the path within ±¾ chip from the reference path exceeds the unconditional mask threshold (SB2 shown in FIG. 8).

If it is determined in the negative in step SB2 (N in SB2 shown in FIG. 8), then the process in step SA15, that is, the masking process on the path within ±¾ chip from the reference path, is immediately performed (SA15 shown in FIG. 8), and the reference path is detected as a probable path (SA16 shown in FIG. 8).

However, if it is determined in the affirmative in step SB2 (Y in SB2 shown in FIG. 8), then the path detecting process according to the first embodiment is entered, that is, the process in step SA6 is entered.

The process from step SA6 to step SA18 shown in FIG. 8 is the same as that according to the first embodiment. Therefore, refer to the corresponding explanation in the first embodiment.

The advantage obtained using the unconditional mask threshold is described below by referring to FIG. 10.

Assume that the delay profile stored in the storage unit 16 is, for example, the delay profile as shown in FIG. 10. The horizontal axis shown in FIG. 10 indicates time with a scale indicating ¼ chip resolution. The vertical axis indicates a reception level (code correlation value).

Assume that the reception level of the path D1 in a timing 160 of the ¼ chip resolution described on the axis shown in FIG. 10 is detected as a probable path.

If there is only the path detecting process according to the first embodiment, and the peaks of the paths D2 and D3 appear near the path D1 by interference of noise and fading with the path D1 having a relatively low reception level, then it is determined in steps SA6 and SA9 that these peaks exceed the ¼ chip shifted adjacent path detection threshold B3 and the ½ chip shifted adjacent path detection threshold C4, thereby detecting the paths D2 and D3 as probable paths (SA7 shown in FIG. 8 and SA10 shown in FIG. 9).

Detecting a number of paths having relatively low reception levels as probable paths lowers the reception characteristic.

Although the delay profile provided in the path detecting process is a delay profile in which one or more paths close to the reference path having relatively low reception levels are detected as probable paths, the masking process is performed on the paths within ±¾ chip from the reference path (SA15 shown in FIG. 9) if the reception level of the paths within ±¾ chip from the reference path is equal to or lower than the unconditional mask threshold (D4 shown in FIG. 10) (N in SB2 shown in FIG. 8), and the reference path is detected as a probable path (SA16 shown in FIG. 9), thereby preventing the paths D2 and D3 from being detected as probable paths. As a result, the reception characteristic can be improved.

Furthermore, it is determined in the negative on the reference path D1 in step SB2, and the masking process is performed on the negated reference path (SA15 shown in FIG. 9), and the reference path D1 is detected as a probable path (SA16 shown in FIG. 9), thereby masking the shadowed portion in detecting a path as shown in FIG. 10.

Thus, with the configuration according to the present invention, although the reception level of the reference path exceeds the path detection threshold, it is further determined (hereinafter referred to as unconditional mask determination) whether or not the reference path exceeds the unconditional mask threshold. If the unconditional mask determination is affirmative, the path detecting process as in the first embodiment is entered. However, if the unconditional mask determination is negative, the masking process is performed on the paths within ±¾ chip from the reference path so that the reference path can be detected as a probable path. Therefore, although the delay profile used in the path detecting process is the delay profile in which one or more paths close to the reference path having relatively low reception levels (hereinafter referred to as vicinal paths) can be detected as probable paths, the vicinal paths are excluded from probable paths, and only the reference path can be detected as a probable path.

As a result, depending on the fluctuation of electric wave propagation, the reception characteristic can be improved much more than in the first embodiment.

Figure 11:
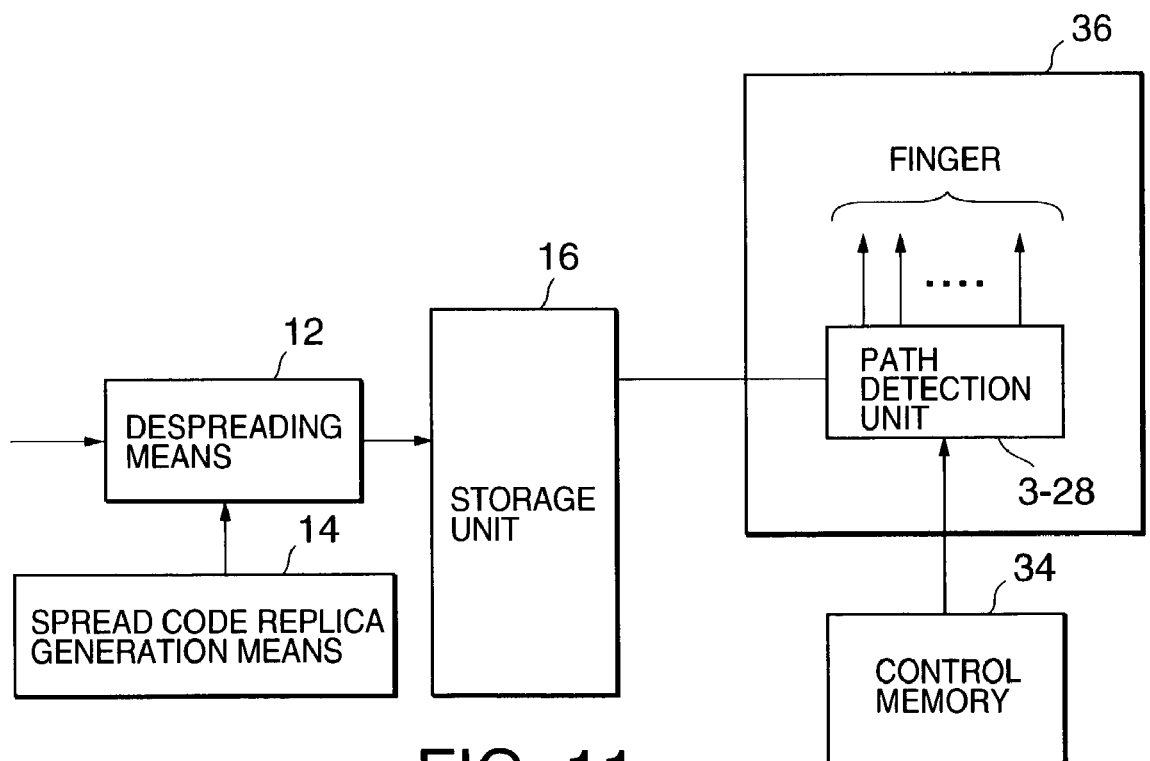
FIG. 11 shows the electric configuration of the path detection apparatus in the CDMA reception device according to a third embodiment of the present invention.
Figure 12:
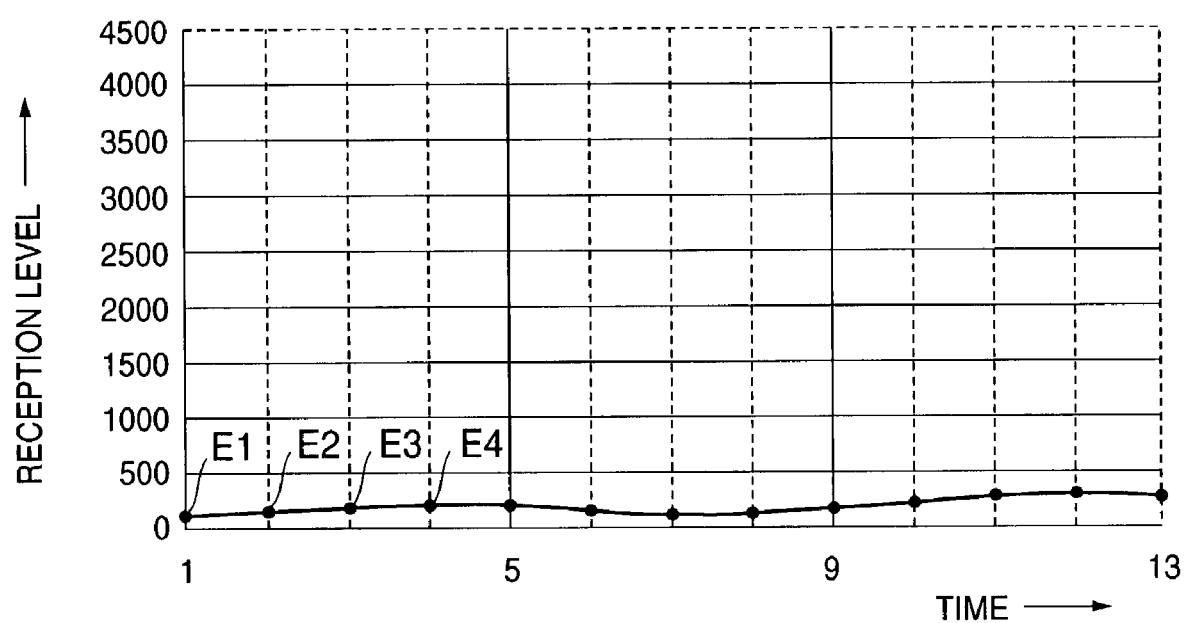
FIG. 12 is an explanatory view showing an example of generating a delay profile in the conventional path detection apparatus.
Figure 13:
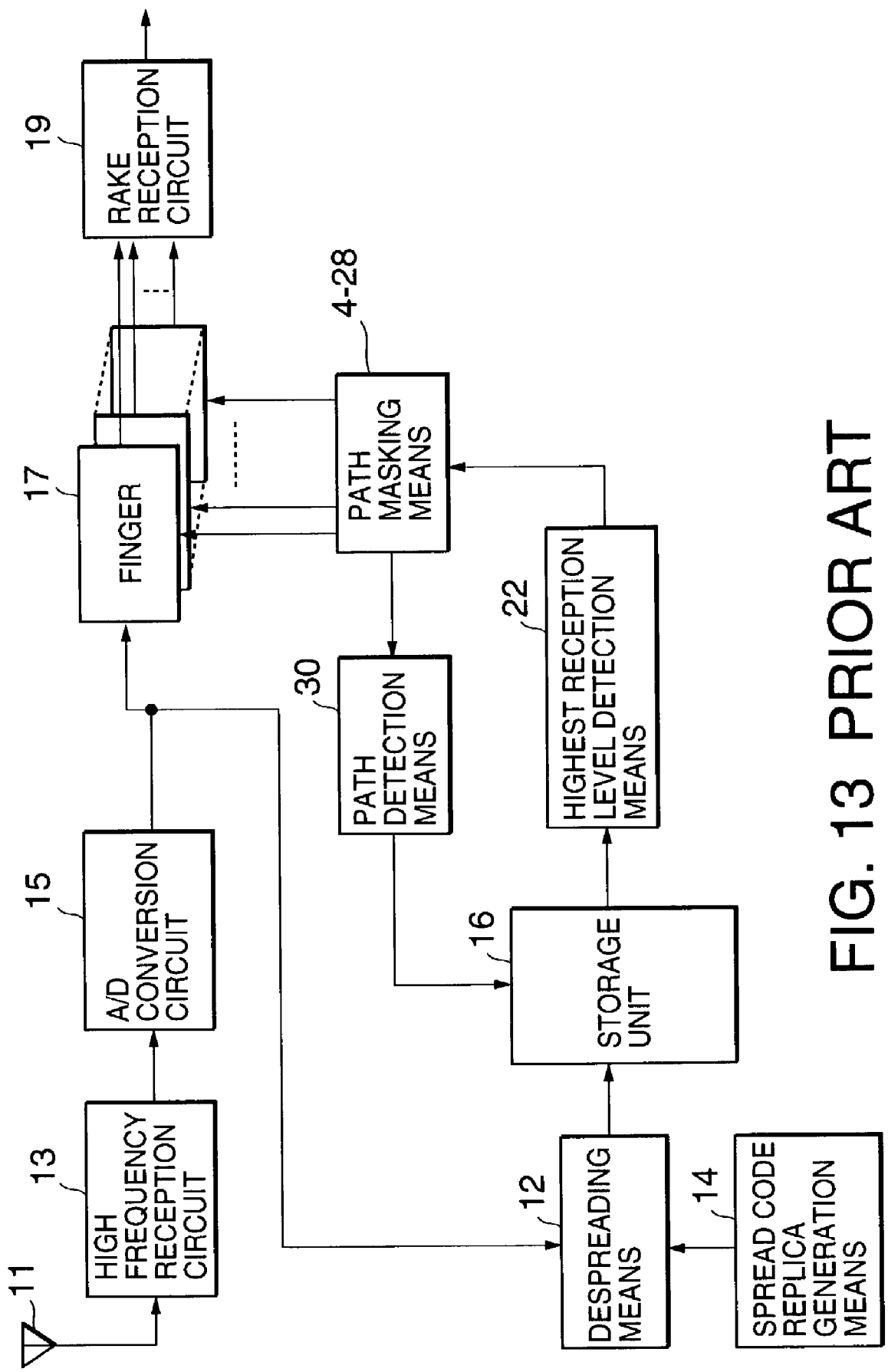
FIG. 13 shows the electric configuration of the path detection apparatus in a conventional CDMA reception device.
Figure 14:
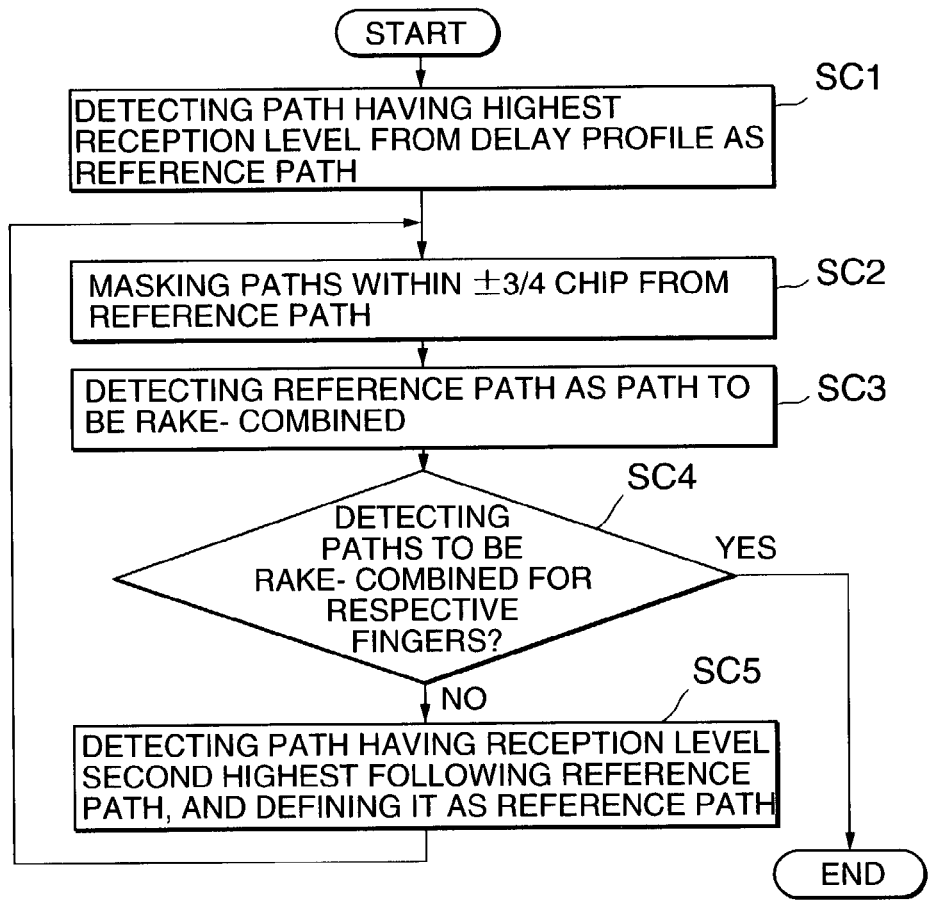
FIG. 14 is a flowchart of the process procedure of the path detection apparatus.
Figure 15:
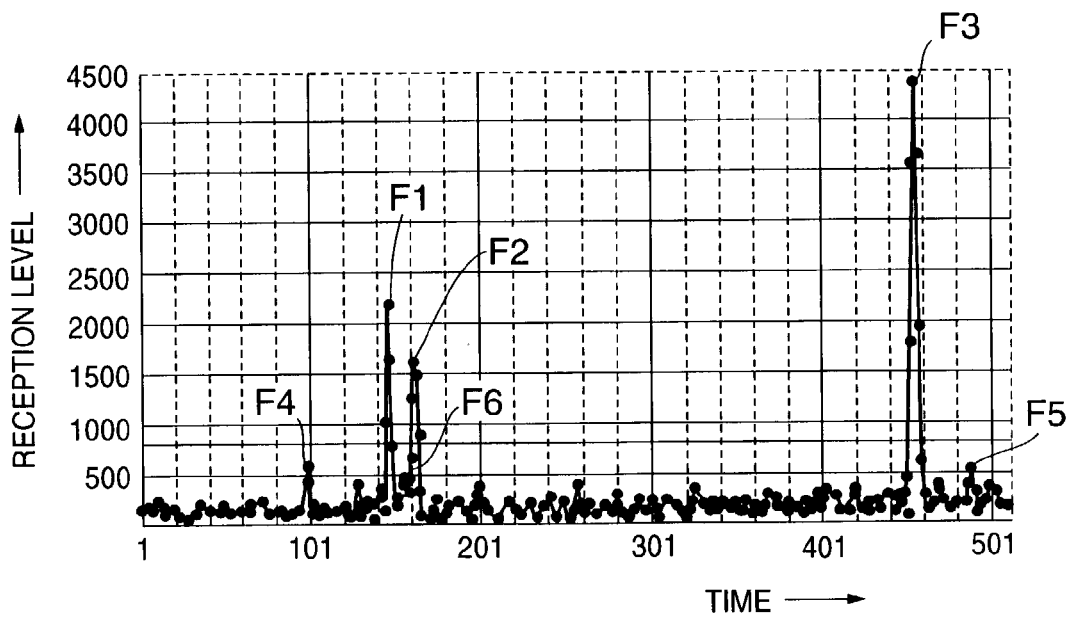
FIG. 15 shows an example of a delay profile generated by the path detection apparatus.
Figure 16:
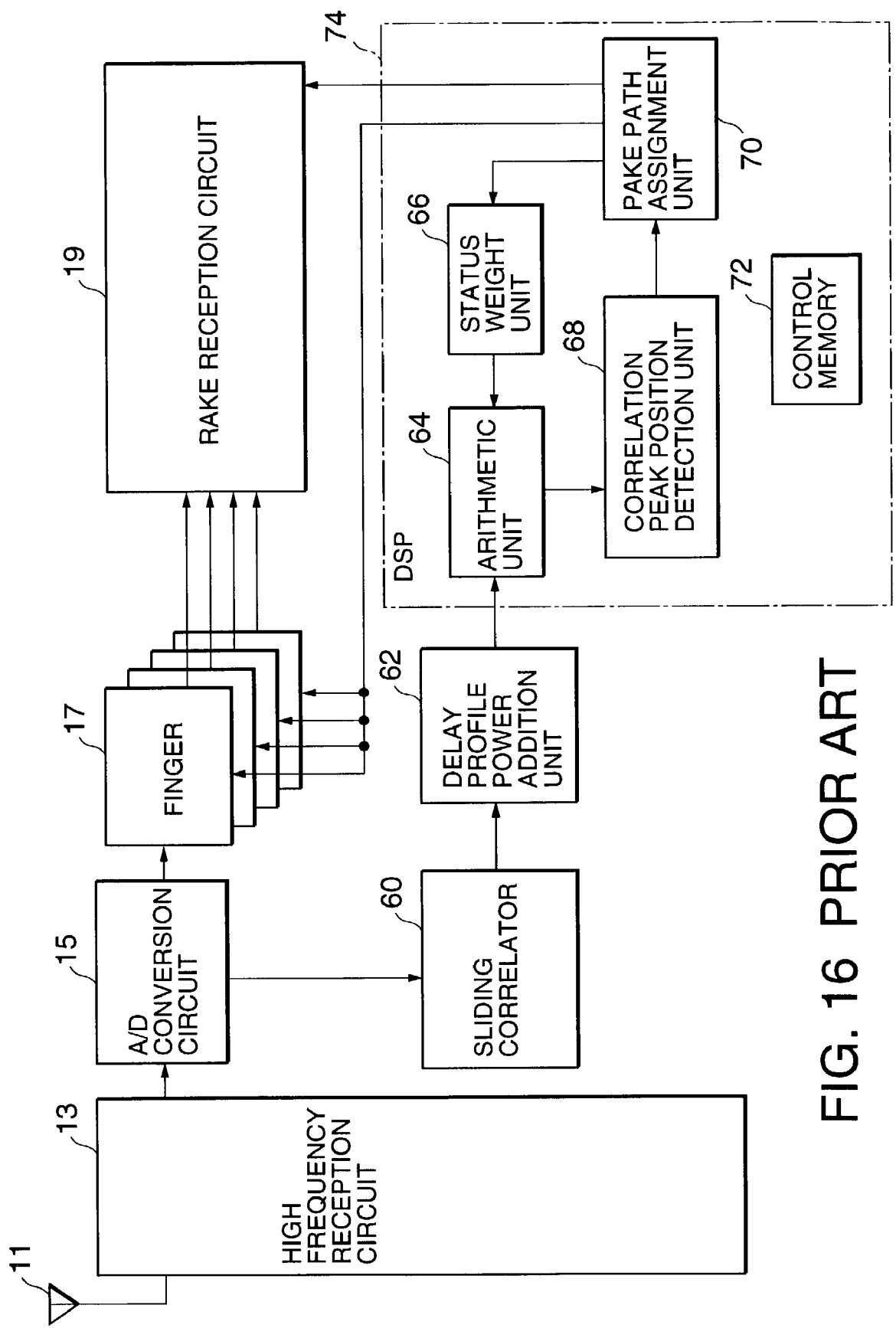
FIG. 16 shows the electric configuration of the path detection apparatus in another conventional CDMA reception device.
Figure 17:
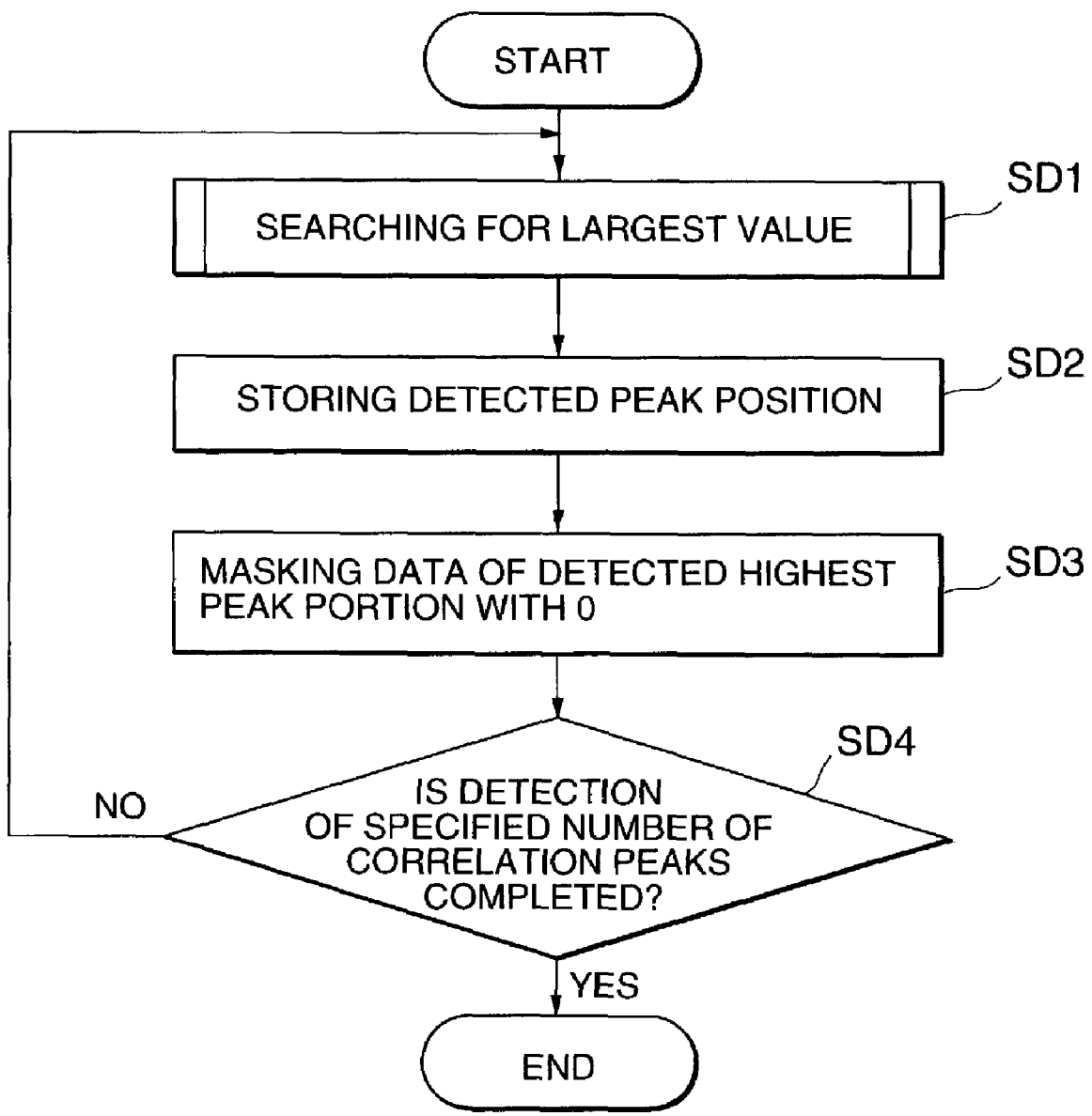
FIG. 17 is a flowchart of the process procedure of the path detection apparatus.
Figure 18:
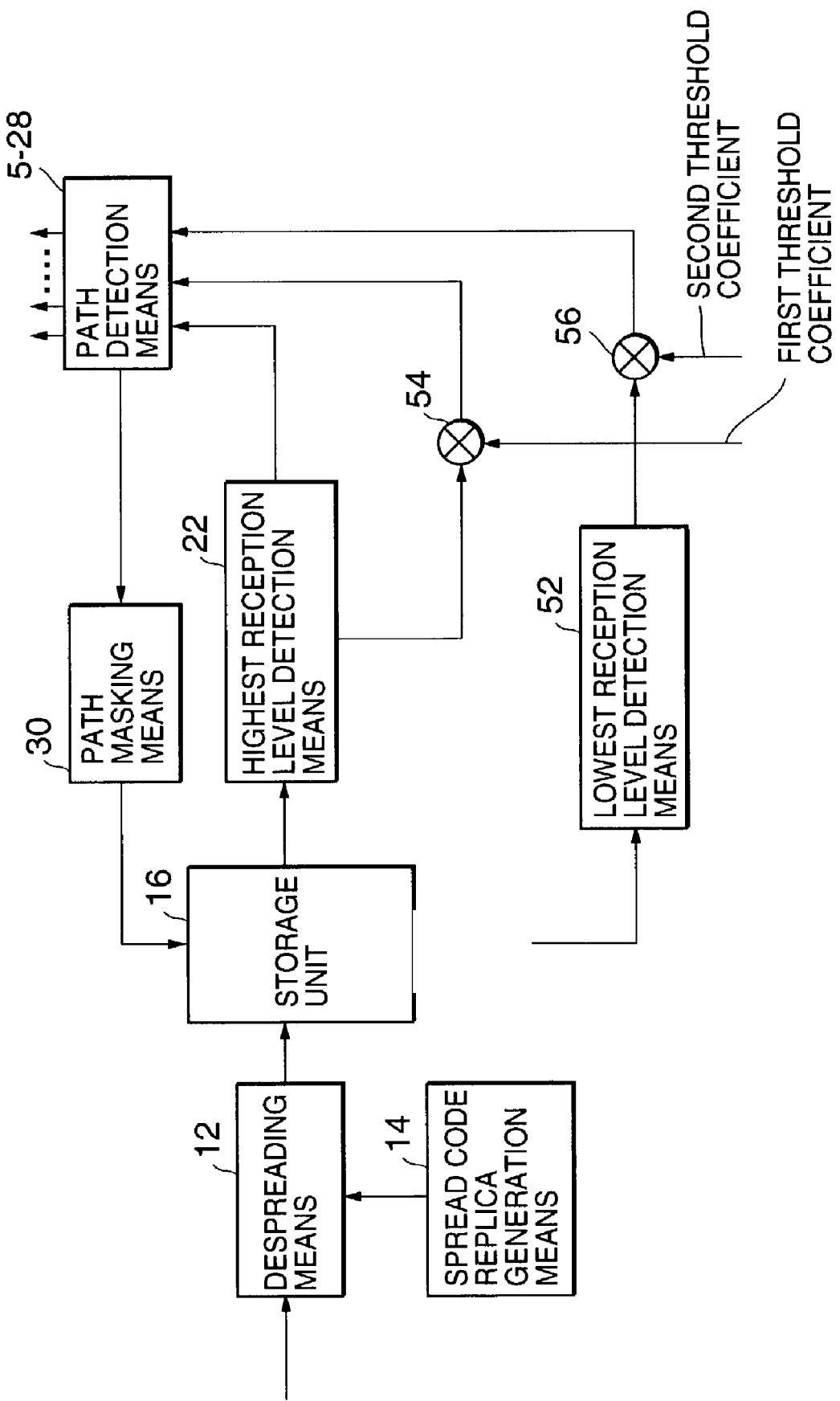
FIG. 18 shows the electric configuration of the path detection apparatus in a further conventional CDMA reception device.
Figure 19:
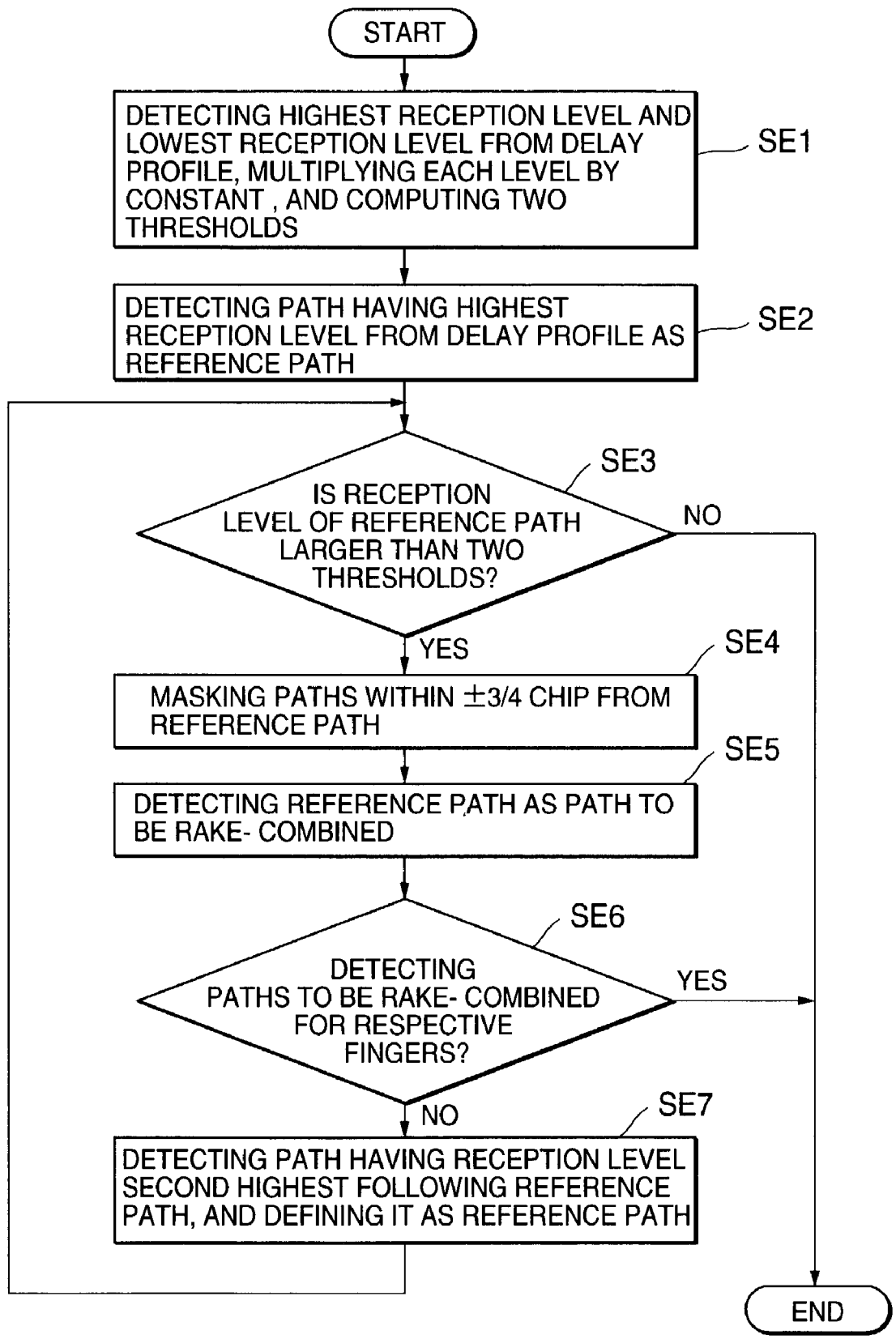
FIG. 19 is a flowchart of the process procedure of the path detection apparatus.
Figure 20:
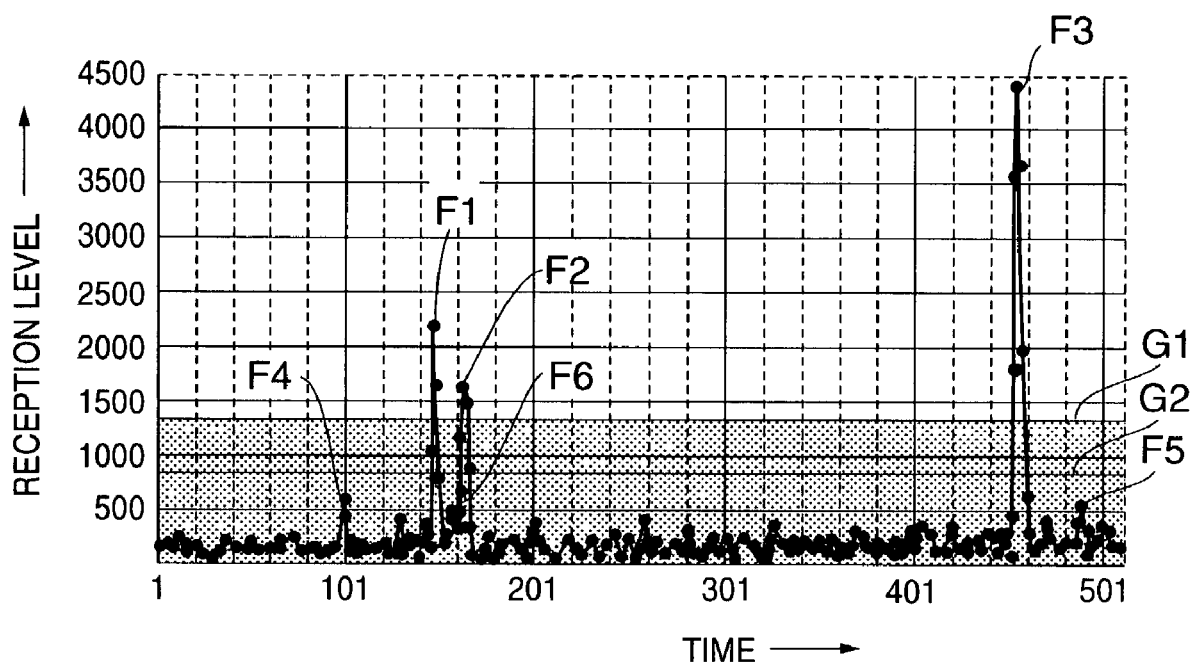
FIG. 20 shows a first example of a delay profile generated by the path detection apparatus.
Figure 21:
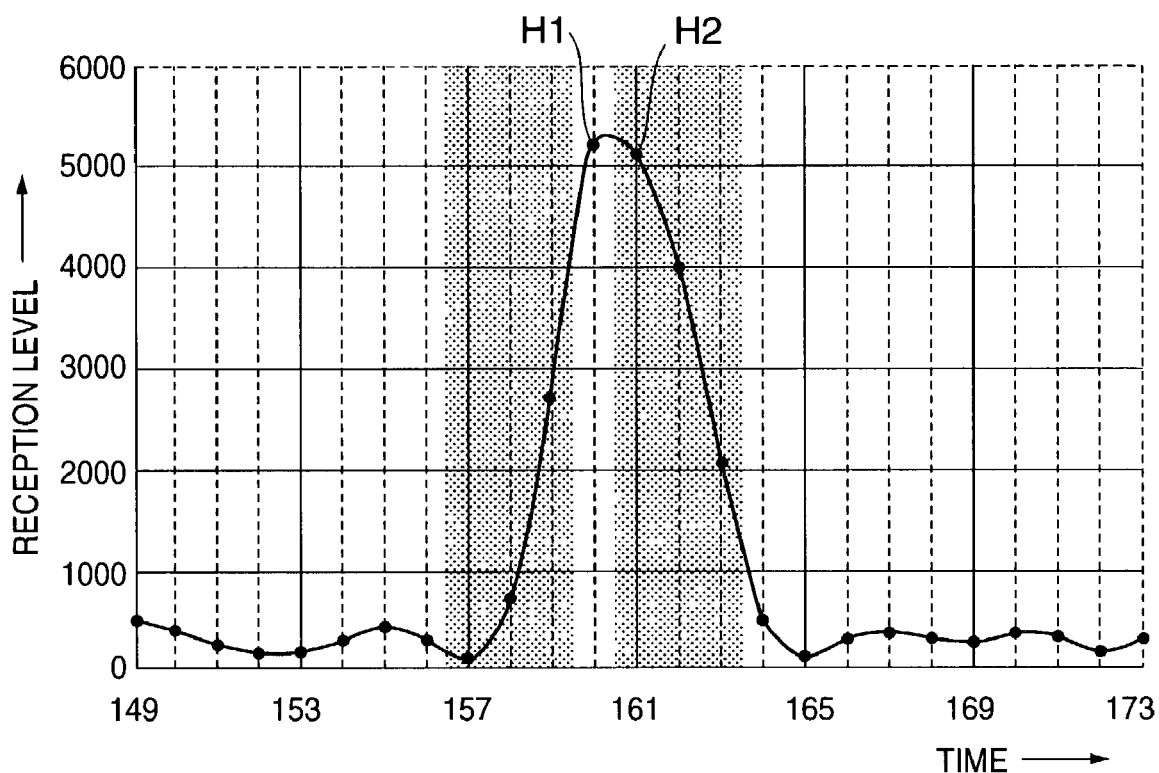
FIG. 21 shows a second example of a delay profile generated by the path detection apparatus.
Figure 22:
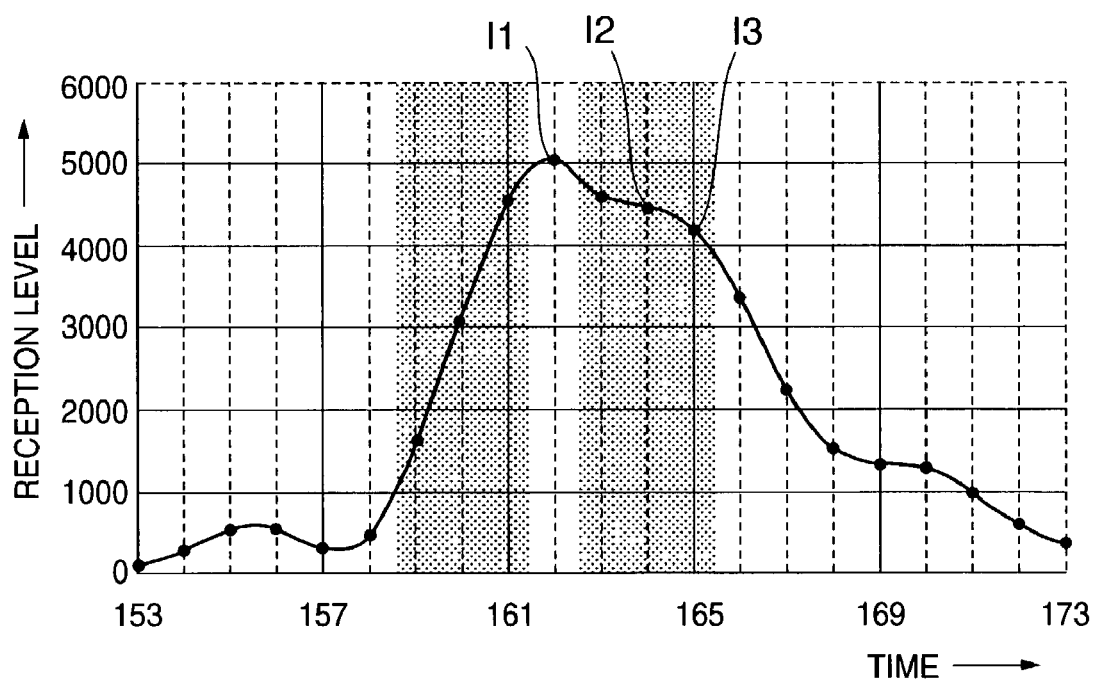
FIG. 22 shows a third example of a delay profile generated by the path detection apparatus.

FIG. 11 shows the electric configuration of the path detection apparatus in the CDMA reception device according to a third embodiment of the present invention.

The configuration of the embodiment is quite different from the configuration of the first and second embodiments in that the process procedures performed by the mean value computation means 18, the first multiplication means 20, the highest reception level detection means 22, the first multiplication means 24, the second multiplication means 26, the path detection means 28, and the path masking means 30 according to the first embodiment, or the mean value computation means 18, the first multiplication means 20, the highest reception level detection means 22, the first multiplication means 24, the second multiplication means 26, the path detection means 2–28, the path masking means 30, and the fourth multiplication means 32 according to the second embodiment are configured by a program, and the program is executed by hardware to realize each of the above mentioned process procedures.

That is, the program describing the above mentioned process procedures is stored in control memory 34. If the control memory 34 is volatile memory, the program is stored in the non-volatile storage device such as a magnetic disk device, etc., read to the volatile memory from the non-volatile storage device when the CDMA reception device is operated, and used in the execution by a general-purpose DSP 36.

When the CDMA reception device is operated, the general-purpose DSP 36 reads a program from the control memory 34, and the execution unit, that is, a path detection unit 3-28, executes the program. Thus, the path detection unit 3-28 performs the path detecting process according to the process procedure shown in FIGS. 2 and 3 described by referring to the first embodiment.

The path detection unit 3-28 outputs a probable path as in the first and second embodiments, and the probable paths are provided for the fingers 17 (not shown in FIG. 11).

The configuration of each unit according to the embodiment other than the above mentioned configuration is the same as the configurations according to the first and second embodiments. Therefore, each of the units is assigned the same reference numeral as in the first or second embodiment, and the detailed explanation is omitted here.

The operation of the embodiment is described below by referring to FIG. 11.

As described above in the first embodiment, when a received signal and a timing signal are provided for the despreading means 12, and when the spread code replica generation means 14 provides a spread code replica for the despreading means 12, the despreading means 12 despreads the received signal at each time of the timing signal, and sequentially generates the reception level configuring a delay profile. The sequentially generated reception levels are sequentially stored in the storage unit 16.

After storing the reception levels in the storage unit 16, the program for executing the process procedure (FIGS. 2 and 3) described in the first embodiment or the process procedure (FIGS. 8 and 9) described in the second embodiment by the general-purpose DSP 36 is read from the control memory 34 by the path detection unit 3-28 of the DSP 16 and executed by the path detection unit 3-28, the reception level of the delay profile stored in the storage unit 16 is read from the storage unit 16 to the path detection unit 3-8 of the general-purpose DSP 36, and is used in detecting a path by the path detection unit 3-28.

A probable path obtained as a result of detecting a path by the path detection unit 3-28 is provided for the fingers 17 described in the first or second embodiment, and a signal (demodulated signal) obtained by despreading a received signal is provided for the rake reception circuit 19.

Thus, with the configuration of the embodiment, the operation effect obtained in the first or second embodiment can also be obtained.

The embodiments of the present invention have been described above by referring to the attached drawings, but the practical configuration of the present invention is not limited to the above mentioned embodiments, but any change in design within the scope of the gist of the present invention can be included in the present invention.

For example, each component of the first and second embodiments can be either a hardware configuration or a software configuration. For example, the mean value computation means 18 can be either a mean value computation circuit or a mean value computation program. This holds true with the highest reception level detection means.

According to the first embodiment, the process in steps SA6 and SA7 shown in FIG. 2, the process in steps SA9 and SA10 shown in FIG. 3, and the process in steps SA12 and SA13 are all included, but one of these three processes can realize the present invention independently or in combination with any of them.

This holds true with the second embodiment.

In the first or second embodiment, the number of detected probable paths can be larger than the number of fingers.

Furthermore, the present invention can be realized with the chip resolution enhanced and the number of processes corresponding to the above mentioned three processes increased.

The shift from the reference path in this case can be the basic unit time which is a significant path detecting time for the improvement of the reception characteristic, or each of the predetermined time in the time exceeding the basic unit time. The value of a predetermined time can be a multiple of a natural number by which the chip resolution is multiplied. The basic unit time or the value of the time exceeding the basic unit time can be used for the value of the predetermined time.

The ¼ chip shifted adjacent path detection threshold coefficient and the ½ chip shifted adjacent path detection threshold coefficient can be replaced with the path detection threshold coefficient in the chip and at a time shifted by a time determined by another chip resolution.

In the path masking means, another masking range in the chip or another masking range beyond the chip can be applied.

In any of the embodiments, the above mentioned probable paths can be applied to the fingers 17 to generate the demodulated signal to be provided for a rake reception circuit, but the demodulated signal generated in the finger 17 can be received by the above mentioned probable paths to be provided for the rake reception circuit 19.

As described above, with the configuration according to the present invention, a mean value of the delay profile can be multiplied by a path detection threshold coefficient, and a path having the reception level exceeding the path detection threshold obtained in the multiplication is defined as a probable path. Therefore, although the reception level is high by the interference or code correlation by noise and fading, a path having the reception level is not misconceived as a probable path, thereby improving the reception characteristic.

Furthermore, a path up to the path detecting time shifted by a predetermined time shorter than the path detecting time significant for improvement of the reception characteristic from the detecting time of a reference path, and a path having the reception level exceeding the path detection threshold at the path detecting time shifted by the predetermined time from the path reception level is defined as a probable path. Therefore, in comparison with the case where the path in the path detecting time is masked, a larger number of probable paths can be detected.

For example, although there is a peak between two path detecting times (sampling time), the path within ±1 from the path detected as the probable path can be defined as probable paths if the reception level at the above mentioned two path detecting times exceeds the path detection threshold.

Furthermore, the paths at a time within ±m (m indicates a natural number determined by the resolution when a delay profile is generated, m>1) sampling times from the path detecting time (sampling time) at which a probable path is detected, and within the path detecting time can be detected as a probable path.

Therefore, the reception characteristic can be improved.

Furthermore, a mean value of the delay profile is multiplied by an unconditional mask threshold coefficient, and a path having a reception level exceeding the unconditional mask threshold obtained by the multiplication is defined as a probable path. Therefore, one or more paths close to the reference path having relatively low reception levels are excluded from probable paths, and only the reference path can be detected as a probable path.

Therefore, depending on the electric wave propagation fluctuation, the improvement of the reception characteristic is further expected.

Although the invention has been described with reference to specific embodiments, this description is not meant to be construed in a limiting sense. Various modifications of the disclosed embodiments will become apparent to persons skilled in the art upon reference to the description of the invention. It is, therefore, contemplated that the appended claims will cover any modifications or embodiments as fall within the true scope of the invention.

What is claimed is:

1. A path detection apparatus for use in a CDMA reception device, comprising:
   a store storing a delay profile; and
   a path detector detecting a path by reading said delay profile from said storage, and performing a rake-combining process based on said read delay profile, wherein
   said path detector comprises:
   a reference path detector detecting a reference path which has an associated reception level that is higher than a first reference level based on said delay profile read by said store; and
   detector for detecting a probable path which has an associated reception level that is higher than a second reference level calculated from said associated reference reception level of said reference path.

2. The path detection apparatus in the CDMA reception device according to claim 1, wherein
   when a total number of probable paths detected when paths having sequentially higher reception levels in said delay profile are detected sequentially as reference paths does not reach a predetermined number of probable paths, said reference path detector detects as a reference path a path having a second highest reception level next to a highest reception level of the reference path last detected at a time shifted before or after a detecting time of the last detected reference path.

3. The path detection apparatus in the CDMA reception device according to claim 1, wherein
   said path detecting time is a predetermined value shorter than a basic unit time of despreading said received signal.

4. The path detection apparatus in the CDMA reception device according to claim 1, wherein
   said path detector detects a probable path on condition that said reception level of said reference path exceeds a path detection threshold obtained by multiplying a mean value of said delay profile by a path detection threshold coefficient.

5. The path detection apparatus in the CDMA reception device according to claim 1, wherein
   said path detector detects a probable path on condition that a path is detected before a time a predetermined time shifted from said detecting time of said reference path, and that said reception level of the path exceeds a first path detection threshold obtained by multiplying said reception level of said detected reference path by a first path detection threshold coefficient at a time shifted by said predetermined time.

6. The path detection apparatus in the CDMA reception device according to claim 1, wherein
   said path detector detects a probable path on condition that said reception level of said reference path exceeds an unconditional mask threshold obtained by multiplying a mean value of said delay profile by an unconditional mask threshold coefficient.

7. The path detection apparatus in the CDMA reception device according to claim 1, wherein
   said path detector detects a probable path on condition that a path is detected at a time shifted longer than a predetermined time from a detection time of said reference path and shorter than said path detection time, and that said reception level of the path exceeds a first path detection threshold obtained by multiplying said reception level of detected reference path by a first path detection threshold coefficient at a time shifted by said predetermined time.

8. The path detection apparatus in the CDMA reception device according to claim 1, wherein
   said path detector is configured as a combination of a part or all of:
   a first detector for detecting a probable path when a reception level of said reference path exceeds a first path detection threshold;
   a second detector for detecting a probable path when said reception level of said reference path exceeds an unconditional mask threshold;
   a third detector for detecting a probable path when the path is detected before a time shifted by a predetermined time, and reception level of the path exceeds said first path detection threshold; and a fourth detector for detecting a probable path when there is a path at a time shifted longer than said predetermined time and shorter than the path detection time, and when the reception level of the path exceeds said first path detection threshold.

9. The path detection apparatus in the CDMA reception device according to claim 5, 6, 7, or 8, wherein
said predetermined time is ¼ of basic unit time.

10. The path detection apparatus in the CDMA reception device according to claim 5, 6, 7, or 8, wherein
said predetermined time is ½ of a basic unit time.

11. The path detection apparatus in the CDMA reception device according to claim 4 or 8, wherein
said path detection threshold coefficient is 3.75.

12. The path detection apparatus in the CDMA reception device according to claim 5 or 8, wherein
said first path detection threshold coefficient is 0.9375.

13. The path detection apparatus in the CDMA reception device according to claim 5 or 8, wherein
said first path detection threshold coefficient is 0.625.

14. The path detection apparatus in the CDMA reception device according to claim 6 or 8, wherein
said unconditional mask threshold coefficient is 8.

15. The path detection apparatus in the CDMA reception device according to claim 7 or 8, wherein
a time longer than said predetermined time and shorter than said path detecting time is ¾ of a basic unit time.

16. A method of detecting probable paths on which a rake-combining process is performed in CDMA reception device, comprising:
deriving a delay profile which includes a plurality of reception levels,
detecting, in response to said delay profile, a first probable path which has an associated reception level that is higher than a first reference level,
obtaining a second reference level by use of the reception level of said first probable path, said second reference level that is higher than said first reference level, and
detecting a second probable path which is close to said first probable path and has an associated reception level that is higher than said second reference level,
said rake-combining process being performed on said first and second probable paths.

17. The method as claimed in claim 16, wherein said second reference level is obtained by multiplying the reception level of said first probable path by a first coefficient.

18. The method as claimed in claim 17, wherein said first coefficient is 0.9375.

19. The method as claimed in claim 16, wherein said first reference level is 3.75.

20. The method as claimed in claim 16, further comprising obtaining a third reference level by use of the reception level of said first probable path, said third reference level being between said first and second reference levels, and
detecting a third probable path which is close to said first and second probable paths and has an associated reception level that is higher than said third reference level,
said rake-combining process being performed on said first, second and third probable paths.

21. The method as claimed in claim 20, wherein said third reference level is obtained by multiplying the reception level of said first probable path by a second coefficient.

22. The method as claimed in claim 21, wherein said second coefficient is 0.625.

* * * * *